(12) United States Patent
Yamazaki et al.

(10) Patent No.: US 6,494,757 B2
(45) Date of Patent: *Dec. 17, 2002

(54) MANUFACTURING METHOD OF SPACER FOR ELECTRON-BEAM APPARATUS AND MANUFACTURING METHOD OF ELECTRON-BEAM APPARATUS

(75) Inventors: Koji Yamazaki, Atsugi; Nobuhiro Ito, Sagamihara; Masahiro Fushimi, Zama, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/512,265

(22) Filed: Feb. 24, 2000

(65) Prior Publication Data

US 2002/0123292 A1 Sep. 5, 2002

(30) Foreign Application Priority Data

Feb. 25, 1999 (JP) ............................................. 11-048492
Feb. 23, 2000 (JP) ....................................... 2000-046353

(51) Int. Cl.$^7$ ................................................. H01J 9/24
(52) U.S. Cl. ......................................................... 445/24
(58) Field of Search ........................................... 445/24

(56) References Cited

U.S. PATENT DOCUMENTS

| 5,066,883 A | 11/1991 | Yoshioka et al. | ............ 313/309 |
|---|---|---|---|
| 5,547,483 A | 8/1996 | Garcia et al. | .................. 65/42 |
| 5,561,340 A | 10/1996 | Jin et al. | .................... 313/309 |
| 5,598,056 A | 1/1997 | Jin et al. | .................... 313/495 |
| 5,690,530 A | 11/1997 | Jin et al. | ...................... 445/24 |
| 5,721,050 A * | 2/1998 | Roman et al. | ............. 428/397 |
| 5,939,822 A | 8/1999 | Alderson | .................... 313/493 |

FOREIGN PATENT DOCUMENTS

| JP | 4-185423 | 7/1992 |
|---|---|---|
| JP | 7-144939 | 6/1995 |
| JP | 8-241666 | 9/1996 |
| JP | 8-241670 | 9/1996 |
| WO | WO-94/18694 A1 * | 8/1994 |

\* cited by examiner

*Primary Examiner*—Kenneth J. Ramsey
(74) *Attorney, Agent, or Firm*—Fitzpatrick, Cella, Harper & Scinto

(57) ABSTRACT

In a manufacturing method of a spacer for an electron-beam apparatus which includes an airtight container and an electron source, the spacer is arranged in the airtight container. The method includes the step of heating and drawing a base material of the spacer to form a desired rough state on the surface of the base material, the step of heating and drawing the base material of the spacer to form the desired rough state and an electroconductive film on the surface of the base material, or the step of heating and drawing the base material of the spacer having the rough state on its surface. According to the present invention, the spacer having a surface structure which can suppress charging can be manufactured at a low cost, and an electron-beam apparatus such as an image-forming apparatus having a sufficient display luminance can also be manufactured.

12 Claims, 13 Drawing Sheets

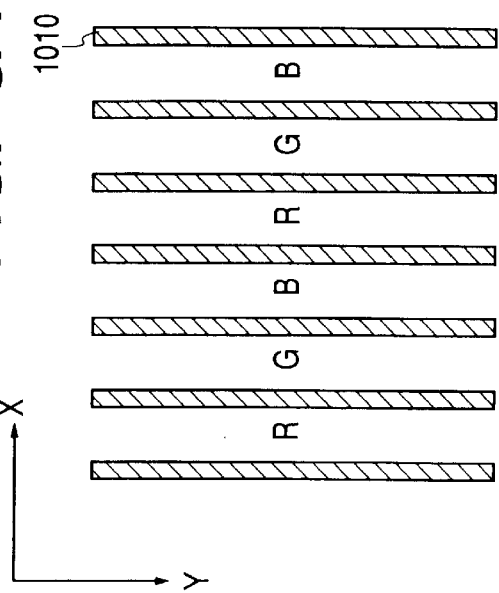
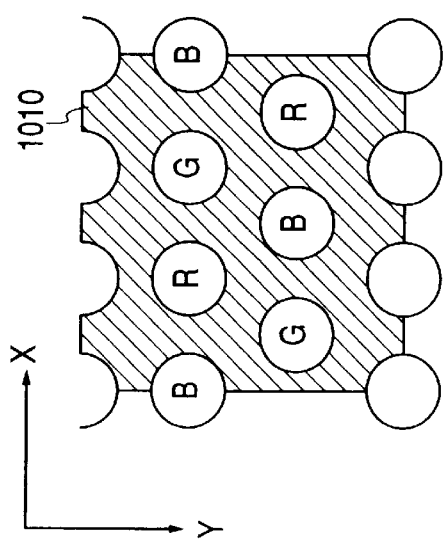
FIG. 8A
FIG. 8B
FIG. 8C
R: RED PHOSPHOR
G: GREEN PHOSPHOR
B: BLUE PHOSPHOR

MANUFACTURING METHOD OF SPACER FOR ELECTRON-BEAM APPARATUS AND MANUFACTURING METHOD OF ELECTRON-BEAM APPARATUS

BACKGROUND OF THE INVENTION

1. Field of the Invention

The present invention relates to a manufacturing method of a spacer used in an electron-beam apparatus such as an image-forming apparatus in which an electron beam is employed, and a manufacturing method of the electron-beam apparatus provided with the spacer.

2. Related Background Art

Heretofore, as an image-forming apparatus in which electron-emitting devices are utilized, an evacuated plane type electron-beam display panel is known in which an electron source substrate having a number of cold-cathode electron-emitting devices thereon and an anode substrate having a transparent electrode and a phosphor thereon are confronted in parallel. Such an image-forming apparatus, in which field emission type electron-emitting devices are used, is disclosed in, for example I. Brodie, "Advanced technology: flat cold-cathode CRTs", Information Display, 1/89, 17 (1989). Further, such an image-forming apparatus, in which surface conduction electron-emitting devices are used, disclosed in, for example, U.S. Pat. No. 5,066,883 and the like. A flat electron-beam display panel permits reduction in weight and the enlargement of a screen compared to a cathode-ray tube (CRT) display unit which is widely used at present, and can provide a higher luminance and a higher quality image than a flat display panel utilizing liquid crystals and other flat display panels such as a plasma display and an electroluminescent display. FIG. 5 shows a perspective view of a conventional flat electron-beam display panel which is partially cut out, as one example of the image-forming apparatus utilizing the electron-emitting devices. The configuration of the electron-beam display panel shown in FIG. 5 will be detailed here. In this drawing, reference numeral 1015 is a rear plate, numeral 1017 is a face plate and 1016 is a side wall, and these members constitute a vacuum envelope. Further, numeral 1011 is an electron source substrate and 1012 is an electron-emitting device. In this example, one phosphor is disposed to one electron-emitting device. Moreover, numeral 1013 (a scanning electrode) and 1014 (a signal electrode) are wiring electrodes, and they are each connected to the electron-emitting device 1012. Furthermore, numeral 1019 is a metal back and 1018 is a phosphor. Moreover, 1020 is a spacer, which holds the electron source substrate 1011 and the face plate 1017 at predetermined intervals and which is arranged in a vacuum envelope as a supporting member against atmospheric pressure. Besides, each junction of the face plate 1017, the side wall 1016, the rear plate 1015 and the spacer 1020 is sealed with a low melting point glass frit.

In order to form an image on this electron-beam display panel, a predetermined voltage is successively applied to the scanning electrode 1013 and the signal electrode 1014 arranged in a matrix state, whereby the predetermined electron-emitting device 1012 positioned at the intersection of the matrix is selectively driven, and the phosphor 1018 is irradiated with emitted electrons to obtain luminescent points at predetermined positions. Besides, for the purpose of obtaining the luminescent points of a higher luminance by accelerating the emitted electrons, a high voltage is applied to the metal back 1019 so as to become a positive potential to the electron-emitting device 1012. Here, the applied voltage is within about several hundred volts to about several ten kilo volts, depending on the performance of the phosphor 1018. Accordingly, the distance d between the electron source substrate 1011 and the face plate 1017 is usually set to about several hundred $\mu$m to about several mm so that vacuum dielectric breakdown (i.e., discharge) may not occur by this applied voltage.

As the display area of this electron-beam display panel increases, the rear plate 1015 and the face plate 1017 need to be thickened to suppress the deformation of a plate substrate due to a difference between a vacuum in the vacuum envelope and an external atmospheric pressure. Thickening the plate substrate not only increases the weight of the display panel but also causes the distortion of the panel and the reduction of a viewable angle range when viewed from an oblique direction. Therefore, the spacer 1020 is disposed, whereby a required strength of both the plates 1015 and 1017 can be relieved, which permits reduction in weight, decrease in cost and the enlargement of the screen. In consequence, the advantage of the flat electron-beam display panel can sufficiently be exerted.

For a material which can be used for this spacer 1020, there are required (1) having a sufficient strength to atmospheric pressure (compressive strength), (2) having a heat resistance which can withstand heating steps in a manufacturing process and a high vacuum formation process, (3) matching to the substrate, the side wall and the like of the display panel in thermal expansion coefficients, (4) being a highly resistant member having insulating characteristics which can withstand the application of a high voltage, (5) a gas emission rate being low in order to maintain a high vacuum, and (6) being workable in a good dimension accuracy and being excellent in productivity. As such a material, a glass material is usually used.

However, the display panel of the image-forming apparatus described above has the following problems.

First, a part of electrons emitted from the vicinity of the spacer hit against the spacer, or ions produced by the function of the emitted electrons adhere to the spacer, whereby spacer charging might be caused. Further, the electrons which reach the face plate are partially reflected and scattered, and its part hit against the spacer, whereby the spacer charging might be caused.

SUMMARY OF THE INVENTION

An object of the present invention is to provide a method of manufacturing by a simple process at a low cost a spacer having a surface structure which can suppress surface charging.

Further, another object of the present invention is to provide an electron-beam apparatus such as an image-forming apparatus which has a sufficient display luminance and which realizes a low cost by the use of the spacer manufactured by the above method or the spacer having such a function.

That is, an aspect of the present invention is directed to a manufacturing method of a spacer for an electron-beam apparatus provided with an airtight container, and an electron source and the spacer arranged in the airtight container, and the manufacturing method comprises the step of heating and drawing a base material of the spacer, a desired rough state being formed on the surface of the base material in the heating and drawing step.

Another aspect of the present invention is directed to a manufacturing method of a spacer of an electron-beam apparatus provided with an airtight container, and an electron source and the spacer arranged in the airtight container, and the manufacturing method comprises the step of heating and drawing a base material of the spacer, a desired rough state and an electroconductive film are formed on the surface of the base material in the heating and drawing step.

Still another aspect of the present invention is directed to a manufacturing method of a spacer of an electronic-beam apparatus provided with an airtight container, and an electron source and the spacer arranged in the airtight container, and the manufacturing method comprises the step of heating and drawing a base material of the spacer having a rough state on its surface.

A further aspect of the present invention is directed to a manufacturing method of a spacer of an electronic-beam apparatus provided with an airtight container, and an electron source and the spacer arranged in the airtight container, and the manufacturing method comprises a step of forming a rough state on the surface of the base material of the spacer, and a step of heating and drawing the base material on which the rough state is formed.

BRIEF DESCRIPTION OF THE DRAWINGS

FIGS. 8A, 8B and 8C are plane views illustrating a phosphor arrangement of a face plate on a display panel;

DETAILED DESCRIPTION OF THE PREFERRED EMBODIMENTS

Figure 1:
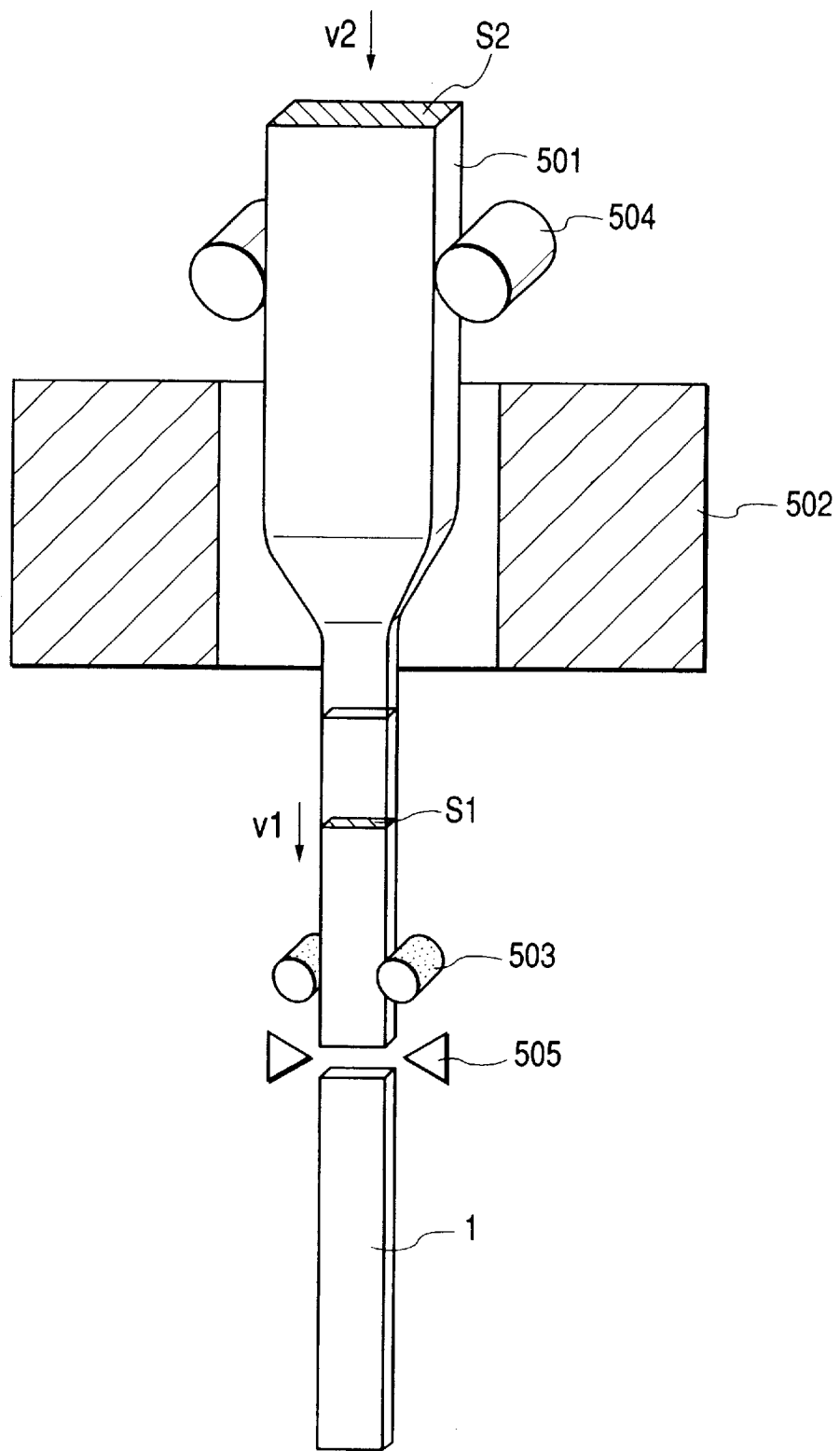
FIG. 1 is a view illustrating an example of embodiments regarding a manufacturing method of a spacer of the present invention.

The present inventors have intensively investigated, and as a result, it has been found that when a rough state is formed on the surface of a spacer of an electron-beam apparatus provided with an electron source and the spacer in an airtight container, a practical coefficient of secondary electron emission can be more reduced than in a case where the surface of the spacer is smooth, so that the charging on the surface of the spacer can effectively be suppressed. Accordingly, in the manufacturing method of the spacer having such a rough surface, a process time which is consumed for the production of the spacer can be largely reduced. In addition, the following method has been found as a manufacturing method which can produce the spacer with a good reproducibility.

That is, the present invention is directed to a manufacturing method of a spacer of an electron-beam apparatus provided with an airtight container, and an electron source and the spacer arranged in the airtight container, and the manufacturing method comprises the step of heating and drawing a base material of the spacer, a desired rough state being formed on the surface of the base material in the heating and drawing step.

The manufacturing method of the spacer described above also may include the step of forming an electroconductive film on the surface of the base material of the spacer formed through the heating and drawing step.

Furthermore, the present invention is concerned with a manufacturing method of a spacer of an electron-beam apparatus provided with an airtight container, and an electron source and the spacer arranged in the airtight container, and the manufacturing method comprises the step of heating and drawing a base material of the spacer, a desired rough state and an electroconductive film being formed on the surface of the base material in the heating and drawing step.

Furthermore, the present invention is concerned with a manufacturing method of a spacer of an electronic-beam apparatus provided with an airtight container, and an electron source and the spacer arranged in the airtight container, and the manufacturing method comprises the step of heating and drawing a base material of the spacer having a rough state on its surface.

Furthermore, the above manufacturing method of the spacer may include the step of forming an electroconductive film on the surface of the base material of the spacer formed through the heating and drawing process, or the step of forming the electroconductive film on the surface of the base material in the heating and drawing step.

Furthermore, the present invention is concerned with a manufacturing method of a spacer of an electronic-beam apparatus provided with an airtight container, and an electron source and the spacer arranged in the airtight container, and the manufacturing method comprises the step of forming a rough state on the surface of the base material of the spacer and heating and the step of heating and drawing the base material on which the rough state is formed.

Moreover, the manufacturing method of the spacer described above may further include the step of forming an electroconductive film on the surface of the base material of the spacer formed through the rough state forming step and the heating and drawing step, or the step of forming the electroconductive film on the surface of the base material in the heating and drawing step.

Furthermore, any of the manufacturing methods of the spacer described above may include that the electron-beam apparatus is an image-forming apparatus provided with an airtight container, an electron source arranged in the airtight container, an image-forming member which forms an image by the irradiation of electrons from the electron source, and a spacer.

Furthermore, the present invention is concerned with a manufacturing method of an electron-beam apparatus provided with an airtight container, and an electron source and a spacer arranged in the airtight container, wherein the spacer is manufactured by any of the manufacturing methods of the spacer described above.

Furthermore, the above manufacturing method of the electron-beam apparatus may include that the electron-beam apparatus is an image-forming apparatus provided with an airtight container, an electron source arranged in the airtight container, an image-forming member which forms an image by the irradiation of electrons from the electron source, and a spacer.

In the present invention described above, first, when a desired rough state is formed on the surface of a base material in the step in which the base material of the spacer is heated and drawn, heat during the heating and drawing step can be utilized in the formation of the rough state, and moreover, and the molding step of a spacer base member from the base material and the formation step of a rough state into the molded spacer base member need not to be provided separately, so that a step time consumed in the production of the spacer can be largely reduced.

Furthermore, when a desired rough state and an electroconductive film are formed on the surface of a base material in the step in which the base material of the spacer is heated and drawn, heat during the heating and drawing step can be utilized for not only the formation of the rough state but also the formation of the electroconductive film. In addition, the formation step of the electroconductive film needs not to be provided separately, so that a step time consumed in the production of the spacer can be largely reduced.

Besides, when the present invention described above comprises the step of heating and drawing the base material of the spacer having the rough state on its surface, or comprises both of the step of forming the rough state on the surface of the base material of the spacer and the step of heating and drawing the base material on which the rough state is formed, the following advantage is present. That is, even when an accuracy error exists in the rough state previously formed on the surface of the base material, the accuracy error can be remarkably reduced to a less serious extent by the subsequent heating and drawing, in addition to the noticeable reduction of the step time as described above. Therefore, the spacer base member having the desired rough state can be produced with a good reproducibility, and an accuracy margin can be largely taken during the formation of the rough state previously formed on the surface of the base material, so that yield can be improved.

Moreover, when the present invention described above comprises the heating and drawing step, a step of polishing the formed spacer base member can be eliminated, and the plurality of spacer base members can simultaneously be processed by one heating step, so that the effect of mass production can be increased.

Furthermore, it is desirable that the coarseness of the rough state on the surface of the spacer base member should be set to 0.1 $\mu$m or more to 100 $\mu$m or less, because the continuity of an electroconductive film formed on the surface is good and the effect of field convergence caused by a steep shape in the protruded portion can also be suppressed.

Furthermore, it is desirable that sheet resistance on the surface of the spacer arranged in the electron-beam apparatus should range from $10^7$ to $10^{14}$ $\Omega/\square$ in view of charging prevention and power consumption.

EMBODIMENT

A desirable embodiment of the present invention will be described below.

First, the first embodiment will be described referring to FIG. 1.

(1) A base material 501 of the spacer having the similar shape of the cross section of a spacer base member to be produced is used. At this time, when the cross section of the desired spacer substrate is s1 and the cross section of the spacer base material is s2, s1 and s2 satisfy s1/s2<1.

(2) Both ends of the spacer base material 501 are secured and a part of the longitudinal direction is heated by a heater 502 at a temperature exceeding a softening point. One end is fed in the direction of the heating portion at a speed V2 by a feeding roller 504 and the other end is drawn in the same direction at a speed v1 by a drawing roller 503. At this time, these speeds v1 and v2 satisfy s1v1=s2v2. Further, the heating temperature depends on the type and processing shape of the base material 501, and shall usually exceed 500 degrees C. Thereupon, the rough state is formed on the surface of a drawing roller 503, and along with heating and drawing, the rough state is sequentially formed on the surface of the drawn base material.

(3) An enlarged base material after it has been cooled is cut at a desired length by a blade 505 to produce a spacer base member.

As described above, if the desired rough state is formed on the surface of the base material in the step in which the base material of a spacer is heated and drawn, the formation of the rough state can use the heat during the heating and drawing time, and moreover, the molding step of a spacer base member from the base material and the formation step of the rough state into the molded spacer base member need not to be provided separately and a great reduction in the step time consumed in the production of the spacer is enabled.

(4) Then, an electroconductive film is formed on the surface of the spacer base member produced as described above.

This electroconductive film is a high-resistive film or low-resistive film described later, and either is formed using the sputtering method, vacuum evaporation method, printing method, aerosol method, or dipping method.

Next, the second embodiment will be described referring to FIG. 2.

(1) A base material 161 of a spacer having the similar shape as the cross section of a spacer base member to be produced is used. Besides, the rough state are previously formed on the surface of the base material of this spacer. Further, when the cross section of a desired spacer base member is s1 and the cross section of the base material of a spacer is s2, s1 and s2 satisfy s1/s2<1.

(2) Both ends of the spacer base material 161 are secured and a part of the longitudinal direction is heated by the heater 502 to a temperature exceeding a softening point. One end is fed in the direction of the heating portion at the speed v2 by the same feeding roller as the first embodiment described previously which is not shown and the other end is drawn at the speed v1 by a drawing roller 163 toward the same direction as v2. At this time, these speeds v1 and v2 satisfy s1v1=s2v2. Further, the heating temperature depends on the type and processing shape of a base, and shall usually exceed 500 degrees C. Along with heating and drawing, the desired rough state is formed on the surface of a drawn base material 162.

(3) An enlarged base material after it has been cooled is cut at a desired length by the same blade as the first embodiment described previously which is not shown to produce a spacer base member.

As described above, if a spacer base material having the rough state on its surface is previously heated and drawn and the rough state is formed on the surface of the spacer base material as the rough state of desired shapes during such heating and drawing step, even when there is an accuracy error in the rough state previously formed on the surface of the base, the accuracy error is greatly reduced to a problem-free extent by subsequent heating and drawing in addition to the great reduction of the same step time as above. Therefore, the spacer base member having the desired rough state can be produced with good reproduction, and an accuracy margin is obtained on a large scale during the formation of the rough state previously formed on the surface of the base material and yield is improved.

(4) Next, the electroconductive film described in the first embodiment described previously is formed on the surface base member produced as described above.

Figure 3:
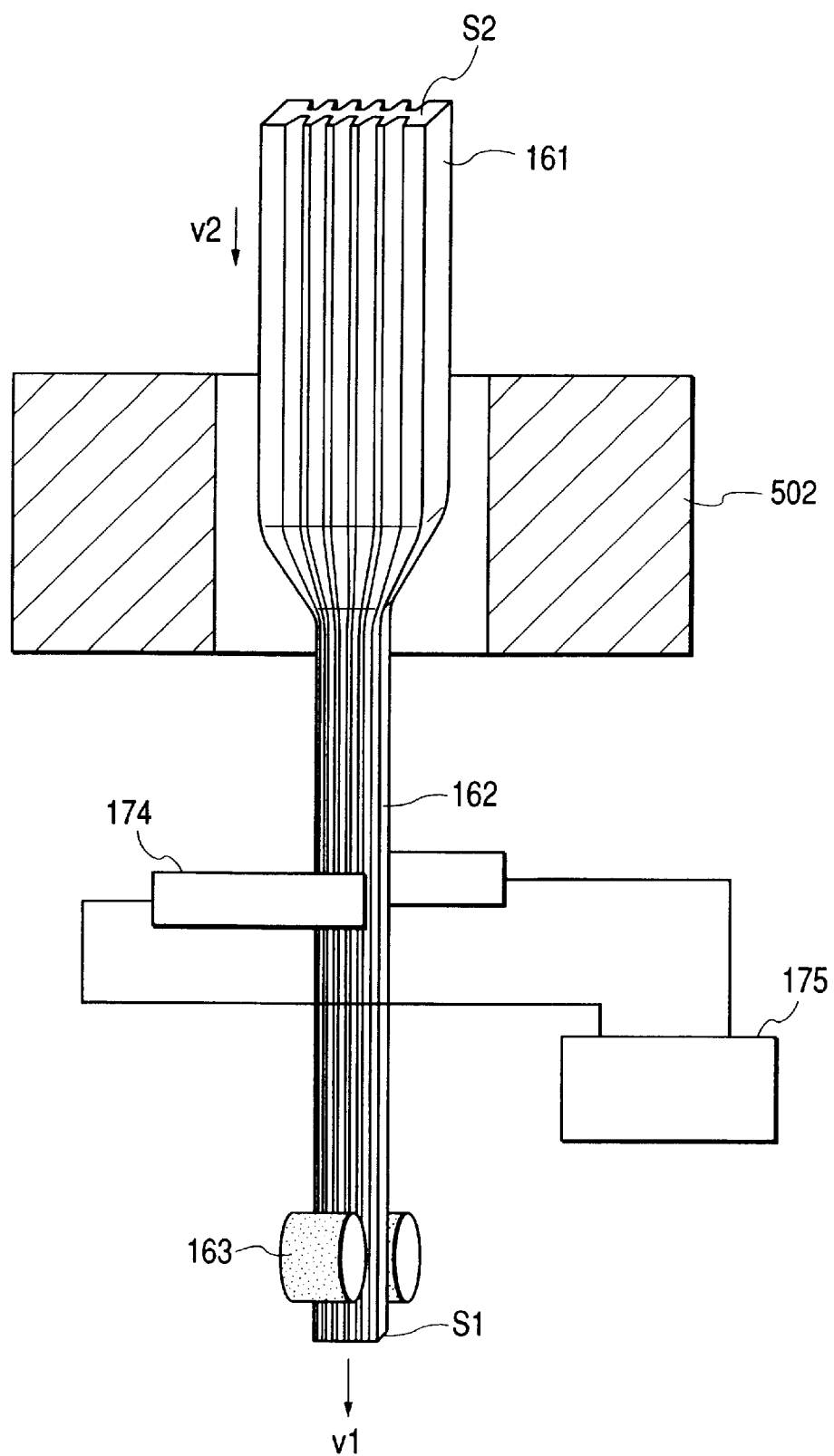
FIG. 3 is a view illustrating still another example of the embodiments regarding the manufacturing method of the spacer of the present invention.

Further, the formation of aforementioned electroconductive film may also be performed during the heating and drawing step of aforementioned spacer base material 161 by depositing means (174 and 175) installed between the heater 502 and the drawing roller 163, as shown in FIG. 3, in the step of aforementioned (2). Besides, the depositing means shown in FIG. 3 is a depositing means of a high-resistive film described later and consists of a spray head portion 174 which coats the drawn spacer base material 162 with the liquid containing the forming material of a high-resistive film and a controller 175 of the spray head 174.

As described above, if the desired rough state and an electroconductive film are formed on the surface of a base material in the step in which the base material of the spacer is heated and drawn, the formation of the rough state can use the heat during the heating and drawing time, and moreover, the formation step of the electroconductive film needs not to be provided separately and a great reduction in the step time consumed in the production of the spacer is enabled.

Figure 4A:
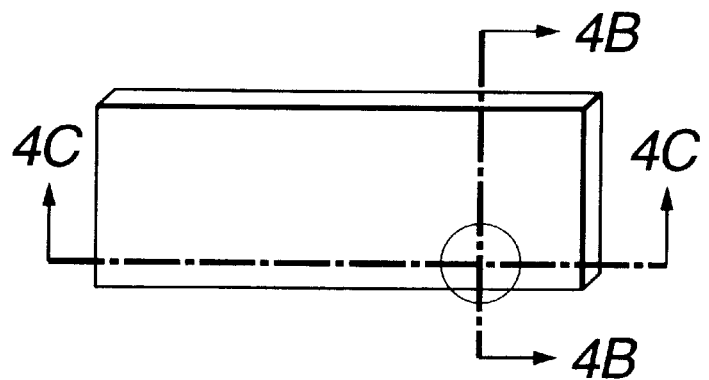
FIGS. 4A, 4B and 4C are schematic views showing an example of the spacer produced by the manufacturing method of the spacer of the present invention.
Figure 4B:
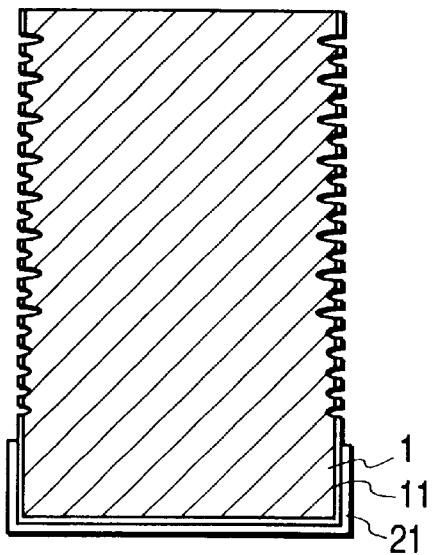
Figure 4C:
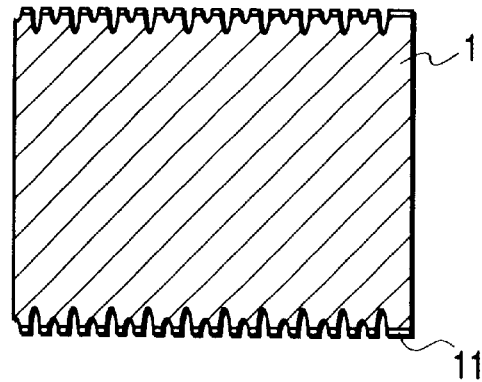

FIG. 4A, FIG. 4B and FIG. 4C are schematic views showing an example of the spacer obtained according to the embodiment described above. FIG. 4B is the schematic view of the cross section which runs in parallel to the vertical direction 4B—4B of FIG. 4A and FIG. 4C is the schematic view of the cross section which runs in parallel to the horizontal direction 4C—4C of FIG. 4A. 1 is a spacer base member in which the desired rough state are formed at least on its surface and 11 is a high-resistive film which is formed on the surface of the spacer base member and whose purpose is the prevention of charging. The high-resistive film 11 forms the rough state on the final surface in conformity with the rough state on the surface of the spacer base member. 21 is a low-resistive film provided to obtain an ohmic contact between the electrode and spacer of an electron-beam apparatus, as requested.

Figure 5:
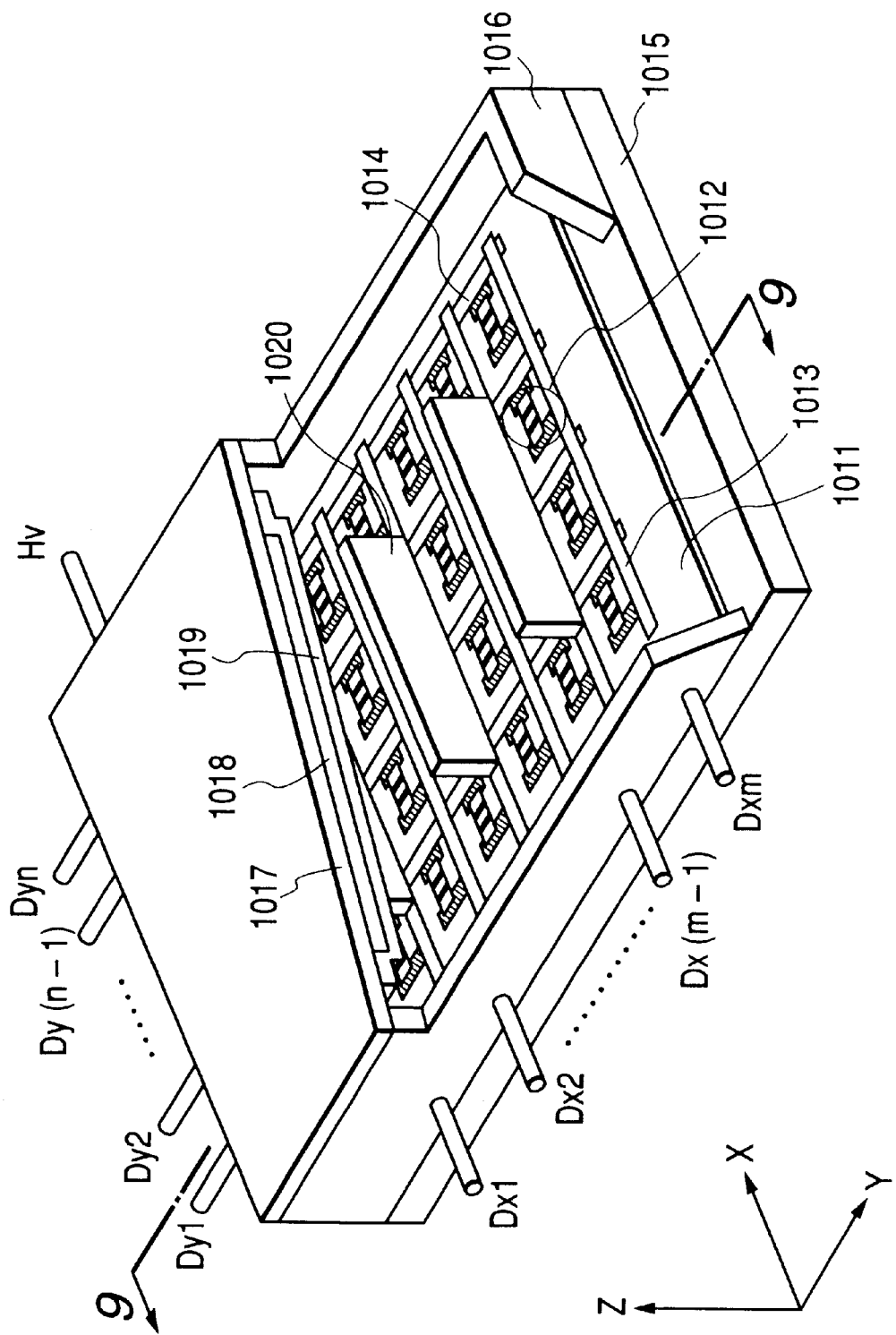
FIG. 5 is a view showing an example of an image-forming apparatus provided with the spacer produced by the manufacturing method of the present invention.

Further, an outline of the structure of a plane type display unit (electron-beam apparatus) which uses a rough base member with the aforementioned high-resistive film in the spacer is shown in FIG. 5 (the details are described later). The display unit has the structure in which a substrate 1011 on which a plurality of cold-cathode devices 1012 are formed and a transparent face plate 1017 on which a phosphor screen 1018 which is a luminescent material are opposed via a. spacer 1020, wherein the spacer 1020 has a rough state on its surface and is coated with a high-resistive film which is formed at a coating thickness not more than the average amplitude value of their rough state and. whose purpose is the prevention of charging.

(Function of the rough state: Dependency of Secondary Electron Emission Charging on Incident Angle)

The following effects can be obtained from the rough state formed on the surface of the spacer manufactured according to the embodiment described above.

The first effect decreases the incident angle of an incident electron in the high incident angle mode which greatly contributes to an amount of charging. Due to the effect of a design of this shape, a decrease effect of the incident angle increment component of a coefficient of secondary electron emission can be suppressed to a level of less than one third against a smooth surface. This effect is especially effective to a direct incident electron whose high incident angle exceeds 80 degrees from the most adjacent electron-emitting device in particular.

Further, as the second effect, an effect of confining a secondary electron is obtained like the accumulation body of a fine Faraday cup if the deep rough state are formed as one form of the rough state.

Furthermore, as the third effect, a suppression effect of a multiple-emission secondary electron is listed. The emitted secondary electron receives energy from the acceleration electric field and advances a trajectory in the anode direction, being accelerated. Because the energy immediately after it has been emitted is comparatively low, it is pulled in a local charging area, reenters a spacer and generates positive charge. At this time, by applying surface roughening to a smooth'substrate, range distance can be divided, and the effect of suppressing the accumulation of the positive charge can be provided.

As the fourth effect, the effect of suppressing an incident angle against an anode radiation electron is listed.

The flying path of an incident electron into a spacer is diversely distributed. In particular, in the re-incidence of a reflection electron from a face plate (hereinafter referred to as an FP reflection electron), because its emission direction is distributed almost concentrically, the reflection electron is distributed in many surrounding directions. As a result of examining the dependence of spacer charging per device on the spacer, the distance between electron-emitting devices and an applied anode voltage by these inventors, it is proved that the radiation electron from an anode substrate is the emission voltage from the third and fourth adjacent electron devices as well as from the most adjacent electron device. The aforementioned range distance is overemphasized per display unit and the degree of the effect is not uniform. In general, for the purpose of obtaining high luminance, the effect is multiplied and becomes one cause of charging due to the installation of members such as aluminum electrodes installed for increasing the utilization efficiency of luminescence from a phosphor and the high voltage of an acceleration voltage. This phenomenon means that the FP reflection electron depends on the distance from the spacer and a closer device has a large amount of re-incidence. It also means that the incident angle during the re-incidence into a far incident point is multiplied as the FP reflection from a luminescent point is done from the distance position nearer to the spacer. For such reason, the rough state formed in many directions function effectively as the suppression effect of the secondary electron emission for the reflection electron in the oblique mode.

This is the main function regarding the charging suppression of a surface-roughened, i.e. a rough surface in this embodiment.

Further, as another effect, because the function of producing a rough state is separated from that of producing an antistatic film, the effect of simply enabling the control of a surface shape from a place inside the surface is generated.
(Periodicity of the rough state)

For the arrangement of the rough state of a spacer in the embodiment described above, to obtain the effect of the secondary electron emission suppression described previously, a periodic arrangement needs not always to be obtained and may also be a random periodic arrangement. What arrangement structure is to be obtained may be decided from the convenience of the production step, for example. In particular, in case of the periodical arrangement, it is desirable that the rough state comprising a plurality of periodic structures should be formed as the repetitive cycle considering the energy distribution and incident angle distribution of secondary electrons and reflection electrons.
(Pitch and amplitude of the rough state)

From the viewpoint of the relaxation effect of the dependence of a secondary electron emission coefficient on an incident angle, the intervals and amplitude of the rough state are not affected greatly and may be selected arbitrarily. It is desirable that the rough state should depend on an acceleration voltage and have an interval or pitch of about 100 $\mu$m considering the effect that a multiple emission secondary electron is trapped before it obtains energy from the electric field between anode and cathode gaps and the acceleration energy of the positive charging area. Further desirably, it is desirable that they should have an interval of less than 10 $\mu$m. Moreover, for the same reason, as the amplitude value of a rough state, an arbitrary value can be selected from the viewpoint of the suppression of the dependence of a secondary electron on the incident angle. It is desirable that the surface roughness (Ra) should be a high value exceeding 0.05 $\mu$m in that the suppression effect of the multiple emission secondary electron is obtained. To suppress the continuity of a film formed on a surface and the effect of the electric field convergence caused by a steep shape in the protruded portion, it is desirable that the average roughness of less than 100 $\mu$m should be obtained as the upper bound.
(High-resistive film)

If an insulating material such as glass is used as the material of a spacer base member, it is desirable that a high-resistive film having an antistatic function should be provided on the surface to improve the antistatic function. This high-resistive film shall produce the rough state on the surface in conformity with the rough state of a lower layer, and various films can fundamentally be used.

To form a high-resistive film having high leveling properties of a rough state, fundamentally, it is important that the high-resistive film is not formed at a considerably larger coating thickness than the desired amplitude value of the lower layer or the substrate rough state, and desirably it is formed at a coating thickness below the amplitude value of the lower layer. However, if the high-resistive film is exceedingly made thin, the sheet resistance is increased, and the continuation of the film is easy to lose in the area where the curvature of the rough state is large (a tight bend). Therefore, if desired conductivity cannot be applied to a spacer, it is desirable that the coating thickness should be at least 10 nm or more and desirably 50 nm or more.

As the production method of a high-resistive film, the existing antistatic film production process can be applied. For example, the sputtering method, vacuum evaporation method, printing method, aerosol method or dipping method can be applied. From the viewpoint of a low-cost production process, the liquid-phase process such as the dipping method is desirable. At this time, it is important to control the coating thickness and the viscosity of a coating liquid to a low value to decrease the leveling properties.

Furthermore, it is desirable that the secondary electron emission coefficient of a high-resistive film should be lower, and it is more desirable that the secondary electron emission coefficient of a smooth film should be below 3.5. Moreover, from the viewpoint of the chemical stability of a film, it is desirable that the surface layer should be in a higher oxidation state than the inside of the film.

Further, in the display unit described previously, the one side of the spacer 1020 is electrically connected to the wiring of the substrate 1011 on which a cold-cathode device is formed. Furthermore, its opposite side is electrically connected to the acceleration electrode (metal-backed phosphor screen 1019) for making the electron emitted from the cold-cathode device collide with a luminescent material (phosphor screen 1018) by high energy. That is, the current in which an acceleration voltage is almost divided by the value of resistance of an antistatic film is applied to the antistatic film formed on the surface of the spacer.

Thereupon, the value of resistance Rs of the spacer is set to the desired range due to the prevention of charging and power consumption. It is desirable that the surface resistance R/□ should be below $10^{13}$ ($\Omega$/□) from the viewpoint of the prevention of charging. To obtain a sufficiently antistatic effect, it is further desirable that the surface resistance should be below $10^{11}$ ($\Omega$/□). The lower bound of the sheet resistance depends on the spacer shape and the voltage applied between the spacers, and it is desirable that the lower bound of the sheet resistance should be $10^5$ ($\Omega$/□) or more.

It is desirable that the thickness t of a high-resistive film should range from 10 nm to 1 $\mu$m. The thickness of the high-resisting film also differs depending on the surface energy of a material and its adhesion to a substrate or a substrate temperature. In general, a thin film of less than 10 nm is formed in an islands structure, its resistance is unstable and the thin film is lack of reproduction. On the other hand, if the coating thickness t exceeds 1 $\mu$m, because the film stress increases, the danger of film peeling increases and the depositing time is prolonged, the productivity is bad. Accordingly, it is desirable that the coating thickness should be 50 to 500 nm. The sheet resistance R/□ is $\rho$/t, and it is desirable that the resistivity $\rho$ of the high-resistive film should be 0.1 to $10^8$ $\Omega$cm from the desirable range of R/□ and t described above. Further, to realize more desirable ranges of the surface resistance and the coating thickness, it is desirable that $\rho$ should be set to $10^2$ to $10^6$ $\Omega$cm. A spacer raises its temperature when a current applies to the high-resistive film formed on the spacer or when the whole display outputs heat during operation. If the resistance temperature coefficient of the high-resistive film is a high, negative value, when the temperature rises, the value of resistance decreases and the current applied to the spacer increases, thereby further causing the temperature rise. Then, the current continues being increasing until the limit of a power supply is exceeded. The value of the resistance temperature coefficient in which a runaway of such current occurs is empirically a negative value and the absolute value exceeds 1%/° C. That is, it is desirable that the resistance temperature coefficient of the high-resistive film should be higher than −1%/° C. (when the value is negative, the absolute value should be less than 1%/° C.).

As materials having high-resistive film characteristics, metal oxides are excellent. Among the metal oxides, chromium, nickel and copper oxides are desirable materials. This is because it is assumed these oxides are comparatively small in the secondary electron emission efficient and are difficult to charge even when the electron emitted from an electron-emitting device touches a spacer. Except the metal oxides, carbon is a desirable material because the secondary electron emission coefficient is small. In particular, because amorphous carbon is high in resistance, the spacer resistance can easily be controlled to a desired value. However, because the aforementioned metal oxides or carbon is hard to adjust the value of resistance to the range of the resistivity which is desirable as a high-resistive film and is easy to change the resistance according to an atmosphere, only these materials are lack of the controllability of the resistance. Aluminum and transition metal alloy nitrides can control the value of resistance over the wide range from a good conductor to an insulator by adjusting the composition of transition metal. Further, in the step of producing a display unit described later, these materials are stable materials whose change in the value of resistance is small. Moreover, because the resistance temperature coefficient is higher than −1%/° C., these materials are practically easy to use. Ti, Cr and Ta are listed as transition metal elements.

The high-resistive film provided on the surface of a spacer may also be a film in which an oxide metal film or carbon film of the top coat layer is laminated on the surface of an aluminum transition alloy nitride film (hereinafter referred to as an alloy nitride film). The value of resistance of the whole high-resistive film is chiefly defined according to the value of resistance of the alloy nitride film and the top coat layer has the effect of suppressing the prevention of charging. Because the top coat layer allows the value of resistance to be controlled by an atmosphere as described previously, the thickness of the top coat layer should be decided so that the value of resistance of the top coat layer can exceed half the value of resistance of the high-resistive film. If the resistivity of the top coat layer is high, because the electric charge accumulated on the surface becomes difficult to quickly set free, a value not exceeding 20 nm at which the thickness of the top coat layer is restricted is desirable.

An alloy nitride film is formed on a spacer substrate by a filming formation means such as the sputtering, reactive sputtering, electron beam evaporation, ion plating or ion assist evaporation method under a nitrogen gas atmosphere. Although a metal oxide film can also be produced by the same film formation method, oxygen gas is used instead of nitrogen gas in this case. In addition, the metal oxide film can be produced even by the CVD method and the alkoxide coating method. A carbon film is produced by the evaporation method, sputtering method, CVD method or the plasma CVD method. In particular, to produce amorphous carbon, hydrogen is contained in an atmosphere during depositing or hydrocarbon gas is used as depositing gas. The alloy nitride film and the top coat layer may also be produced by another device, and the adhesion of the top coat layer by successively laminating them. Although the antistatic film of this embodiment is described against the prevention of spacer charging of a plane type display unit, it can be used as a high-resistive film in another application without being restricted to this application.

Further, the distribution of a horizontally charged electric charge can be suppressed by allowing the spacer provided on the high-resistive film to have a low-resistive film in the contact portion with the top and bottom substrates. Furthermore, it is desirable that the value of resistance of the low-resistive film should be below one tenth the value of resistance of the high-resistive film and below $10^7$ (Ω/□) as the area resistance for the purpose of improving the electrical junction with the top and bottom substrates. Moreover, the electron-emitting device is a cold-cathode device, and that the electron-emitting device having the electroconductive film including an electron-emitting region between electrodes. Besides, it is more desirable because the structure of the device is simple and high luminance can be obtained by allowing the electron-emitting device to have a surface conduction electron-emitting device.

Furthermore, as an image-forming apparatus which forms an image by irradiating the target with the electron emitted from the electron-emitting device according to an input signal, the electron-beam device to which this proposal applies can be adapted. As the target, a latent image can be formed using various materials from the viewpoint of image recording, moving pictures (video) can economically be recorded and displayed by making the target consist of a phosphor.

(Outline of image-forming apparatus)

Next, the configuration and manufacturing method of the display panel of an image-forming apparatus to which the spacer manufactured according to the aforementioned embodiment are described showing a specific example.

FIG. 5 is a perspective diagram of the display panel used as this example, and the diagram is shown in which a part of the panel is omitted to show the internal structure.

In the diagram, 1015 is a rear plate, 1016 is a side wall and 1017 is a face plate. An airtight container for maintaining the inside of the display panel under vacuum is formed by 1015 to 1017. To assemble the airtight container, it needs to be sealed so that the junction of each member can hold sufficient strength and airtightness. For example, sealing is achieved by coating the junction with frit glass and baking it ten minutes or more at 400 to 500 degrees C. under an atmosphere or nitrogen atmosphere. The method of evacuating the inside of the airtight container will be described later. Further, because the inside of the airtight container is held under the vacuum of about $10^{-4}$ (Pa), the spacer 1020 is provided as an atmospheric-pressure-proof body for the purpose of preventing the damage of the airtight container caused by atmosphere pressure or a sudden shock.

A substrate 1011 is secured to the rear plate 1015, and N×M pieces of cold-cathode devices 1012 are formed on the substrate. (N and M are positive integers exceeding 2 and are properly set according to the targeted number of display elements. For example, in a display unit whose purpose is the display of a high definition television set, it is desirable that numbers exceeding N=3,000 and M=1,000 should be set.) The N×M pieces of cold-cathode devices are wired in a simple matrix shape by M lines of row-directional wiring 1013 and N lines of column-directional wiring 1014. The portion configured with 1011 to 1014 described previously is called a multiple electron beam source.

If the multiple electron beam source used in an image-forming apparatus is an electron source in which a cold-cathode device is wired in a simple matrix shape, there are no restrictions in the material and shape or manufacturing method of the cold-cathode device. Accordingly, for example, a surface conduction electron-emitting device and an FE type or an MIM type cold-cathode device can be used.

Next, reference will be made to the structure of a multiple electron beam source in which a surface conduction electron-emitting device (described later) is arranged on a substrate as a cold-cathode device and is wired in a simple matrix shape.

Figure 6:
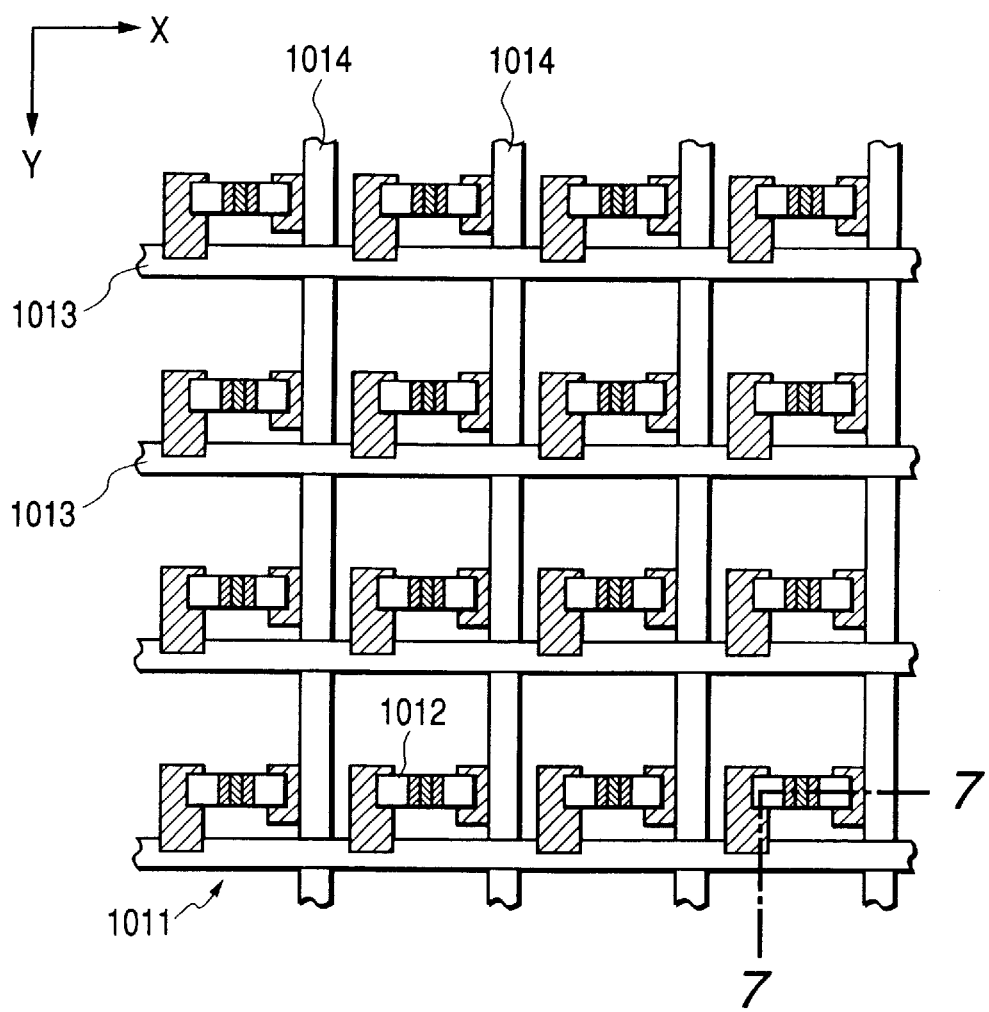
FIG. 6 is a plane view of a substrate of a multiple electron beam source used in an example.

A plane view of the multiple electron beam source used in the display panel of FIG. 5 is shown in FIG. 6. The surface conduction electron-emitting devices 1012 are arranged on the substrate 1011 and these devices are wired in a simple matrix shape by the row-directional wiring 1013 and the column-directional wiring 1014. An insulating layer (not shown) is formed between electrodes in the intersection of the row-directional wiring 1013 and the column-directional wiring 1014, thereby holding electrical insulation.

Figure 7:
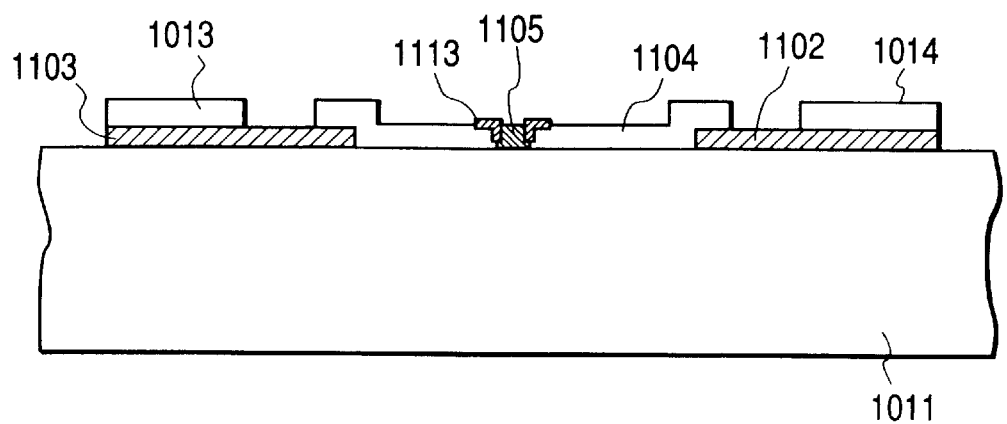
FIG. 7 is a partially sectional view of the substrate of the multiple electron beam source used in the example.

The cross section which runs in parallel to 7—7 of FIG. 6 is shown in FIG. 7.

Besides, after the row-directional wiring 1013, the column-directional wiring 1014, an inter-electrode insulating layer (not shown) and the device electrode and electroconductive film of a surface conduction electron-emitting device have previously been formed on a substrate, the multiple electron source having such structure is manufactured by feeding power to each device via the row-directional wiring 1013 and the column-directional wiring 1014 and performing energization forming operation (described later) and energization activation operation (described later).

This example has the structure in which the substrate 1011 of a multiple electron beam source is secured to the rear plate 1015 of an airtight container. If the substrate 1011 or the multiple electron beam source has sufficient strength, the substrate 1011 itself of the multiple electron beam source may also be used as the rear plate of the airtight container.

Further, the phosphor screen 1018 is formed at the bottom of the face plate 1017. Because this example is a color display unit, the portion of the phosphor screen 1018 is separately coated with a phosphor consisting of the three primary colors of red, green and blue used in the field of a CRT. The phosphor of each color is separately applied in a stripe shape as shown in FIG. 8A, for example, and a black conductor 1010 is provided between the stripes of the phosphor. The purpose of providing the black conductor 1010 is to prevent a shift from occurring a display color even if there is a slight shift at the irradiation position of an electron beam, to prevent the lowering of a display contrast by preventing the reflection of external light and to prevent the charge-up of the phosphor screen caused by the electron beam. The black conductor 1010 uses graphite as the main component, but other materials may also be used if the aforementioned purposes are satisfied.

Furthermore, the method of separately applying a phosphor of three primary colors is not restricted to the arrangement in a stripe shape shown in FIG. 8A described previously, and for example, it may also be the delta-shaped arrangement as shown in FIG. 8B or other arrangements (for example, FIG. 8C).

Besides, to produce a monochromatic display panel, a single-color phosphor material may be used as the phosphor screen 1018, and a black conductive material needs not always to be used.

Further, a known metal-backed phosphor screen 1019 is provided on the surface of the rear plate side of the phosphor screen 1018 in the field of a CRT. The purpose of providing the metal-backed phosphor screen 1019 is to improve the utilization factor of light by reflecting a part of the light radiated by the phosphor screen 1018 on a mirror finished surface, to protect the phosphor screen 1018 from the collision of a negative ion, to operate the metal-backed phosphor screen as an electrode for applying an electron beam acceleration voltage and to operate it as the conductive path of an electron which excites the phosphor screen 1018. After the phosphor screen 1018 has been formed on the face plate substrate 1017, the metal-backed phosphor screen 1019 is formed using the method of smoothening the surface of the phosphor screen and vacuum-evaporating Al on it. Besides, if a phosphor material for low voltage is used in the phosphor screen 1018, the metal-backed phosphor screen is not used.

Furthermore, although a transparent electrode is not used in this example, for example, the transparent electrode which uses ITO as a material may also be provided between the face plate substrate 1017 and the phosphor screen 1018 for the purpose of applying an acceleration voltage and improving the conductivity of the phosphor screen.

Figure 9:
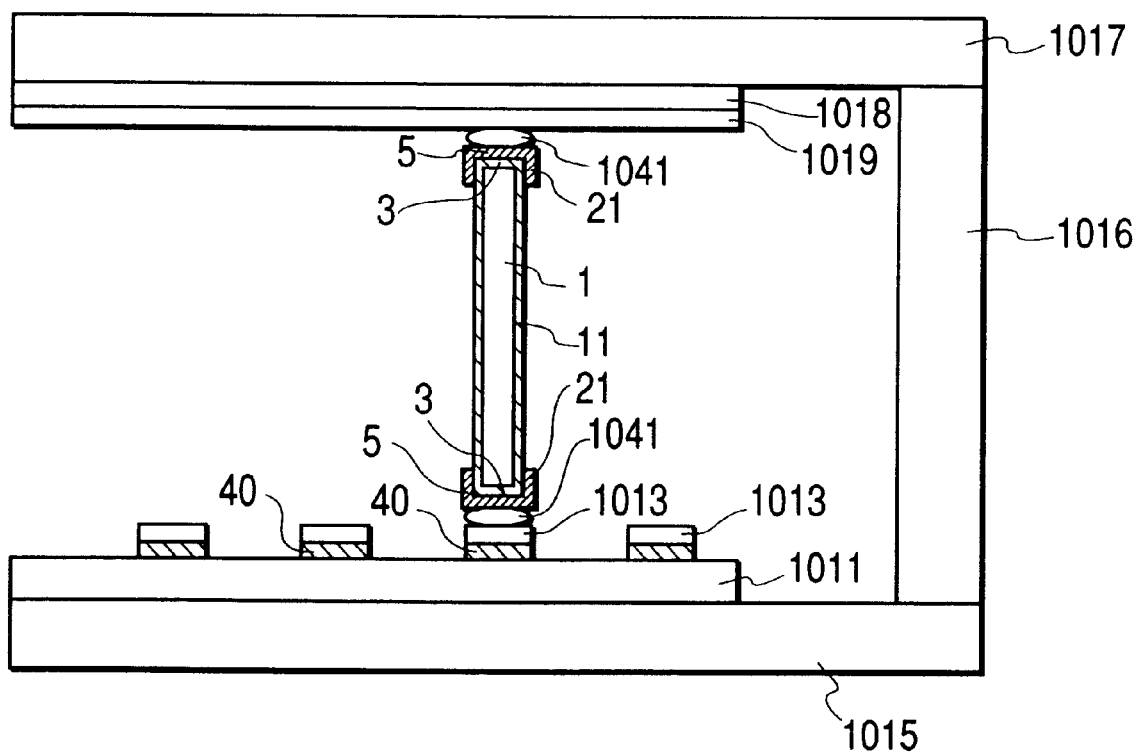
FIG. 9 is a sectional view along the line 9—9 of a display panel regarding the example of the present invention.

FIG. 9 is a schematic view of the cross section 9—9 of FIG. 5, and the number of each portion corresponds to FIG. 5. The spacer 1020 consists of members in which, on the spacer base material substrate 1, the high-resistive film 11 whose purpose is the prevention of charging is deposited, and then a low-resisting film 21 is deposited on a joint surface 3 of the spacer facing the inside (metal-backed phosphor screen 1019 or the like) of the face plate 1017 and the surface (row-directional wiring 1013 or column-directional wiring 1014) of the substrate loll and its adjoining side portion 5. Further, to attain the aforementioned purpose, only the required number of spacers is arranged at necessary intervals and the spacers are secured to the inside of the face plate and the surface of the substrate 1011 with a jointing material 1041. Furthermore, the high-resistive film is deposited on the surface exposed under the vacuum of at least an airtight container in the surfaces of the spacer base material substrate 1, and is electrically connected to the inside (metal-backed phosphor screen 1019 or the like) of the face plate 1017 and the surface (row-directional wiring 1013 or column-directional wiring 1014) of the substrate 1011 via the low-resistive film 21 on the spacer 1020 and the jointing material 1041. In the embodiment described here, the shape of the spacer 1020 is made a thin plate shape. It is arranged in parallel to the row-directional wiring 1013 and is electrically connected to the column-directional wiring 1013. A reference numeral 40 denotes an inter-electrode insulating film for insulating a column-directional wiring (not shown in the drawing) from a row-directional wiring 1013.

The spacer 1020 needs to have such insulation as can resist to the high voltage applied between the row-directional wiring 1013 and the column-directional wiring 1014 on the substrate 1011 and the metal-backed phosphor screen 1019 on the inside of the face plate 1017, and have such conductivity as prevents the charging into the surface of the spacer 1020.

As the spacer base member 1 of the spacer 1020, for example, ceramic members are listed such as quartz glass, the glass in which the content of impurities like Na is reduced, soda lime glass and alumina. Besides, it is desirable that the space base member 1 should have a thermal expansion coefficient approximate to that of a member consisting of an airtight container and the substrate 1011.

The low-resistive film 21 comprising the spacer 1020 is provided to electrically connect the high-resistive film 11 to the face plate 1017 (metal-backed phosphor screen 1019 or the like) on the side of high potential and the substrate 1011 (wiring 1013, 1014 or the like) on the side of low potential, and the name of an intermediate electrode layer (intermediate layer) is also used below. The intermediate electrode layer (intermediate layer) can have a plurality of functions listed below.

(1) The high-resistive film 11 is electrically connected to the face plate 1017 and the substrate 1011.

As described already, the high-resistive film 11 is provided for the purpose of preventing the charging on the surface of the spacer 1020. If the high-resistive film 11 is directly connected to the face plate 1017 (metal-backed phosphor screen 1019 or the like) and the substrate 1011 (wiring 1013, 1014 or the like) or via the jointing material 1041, a high contact resistance occurs on the interface of the junction and the electric charge generated on the surface of the spacer may not be able to be removed quickly. To avoid this, a low-resistive intermediate layer is provided on the jointing surface 3 of the spacer 1020 which touches the face plate 1017, the substrate 1011 and the jointing material 1041 or the side portion 5 near by the jointing surface together with the jointing surface.

(2) The potential distribution of the high-resistive film 11 is made uniform.

The electron emitted from the cold-cathode device 1012 forms an electron trajectory in accordance with the potential distribution formed between the face plate 1017 and the substrate 1011. To prevent turbulence from occurring in the electron trajectory in the vicinity of the spacer 1020, the potential distribution of the high-resistive film 11 needs to be controlled over all areas. If the high-resistive film 11 is directly connected to the face plate 1017 (metal-backed phosphor screen 1019 or the like) and the substrate 1011 (wiring 1013, 1014 or the like) or via the jointing material 1041, nonuniformity of a connected state is generated due to the contact resistance of the interface of the connecting portion, and the potential distribution of the high-resistive film 11 may be shifted from a desired value. To avoid this, a low-resistive layer is provided over the full length area of the spacer end (contact surface 3 or side portion 5) in which the spacer 1020 joins with the face plate 1017 and the substrate 1011, and the potential of the whole high-resistive film 11 can be controlled by applying a desired voltage to this intermediate layer portion.

(3) The trajectory of an emitted electron is controlled.

The electron emitted from the cold-cathode device 1012 forms an electron trajectory in accordance with the potential distribution formed between the face plate 1017 and the substrate 1011. Regarding the electron emitted from the cold-cathode device in the vicinity of a spacer, the restrictions (changes in wiring and device positions) caused by installation of the spacer may occur. In such case, to form an image without distortion and nonuniformity, the desired position on the face plate 1017 needs to be irradiated with an electron by controlling the trajectory of the emitted electron. By providing a low-resistive intermediate layer in the side portion 5 on the surface which joins with the face plate 1017 and the substrate 1011, the potential distribution in the vicinity of the spacer 1020 is characterized by desired characteristics and the trajectory of the emitted electron can be controlled.

The low-resistive film 21 shall select materials having a sufficiently lower value of resistance than the high-resistive film 11, and the materials are properly selected from printing conductors consisting of metals such as Ni, Cr, Au, Mo, W, Pt, Ti, Al, Cu and Pd or an alloy, and metals such as Pd, Ag, Au, $RuO_2$ and Pd-Ag, metal oxides and glass or a transparent conductor such as $In_2O_3$—$SnO_2$ and a semiconductor material such as polysilicon.

The jointing material 1041 needs to have conductivity so that the spacer 1020 can be electrically connected to the row-directional wiring 1013 and the metal-backed phosphor screen 1019. That is, the frit glass to which conductive adhesives, metal particles and conductive filler are added is suitable for the jointing material.

Further, Dx1 to Dxm, Dy1 to Dyn and Hv are electrical connection terminals having airtight structures which are provided for electrically connecting the pertinent display panel and an electrical circuit not shown.

Dx1 to Dxm is electrically connected to the row-directional wiring 1013 of a multiple electron beam source, Dy1 to Dyn to the column-directional wiring 1014 of the multiple electron beam source and Hv to the metal-backed phosphor screen 1019 of a face plate respectively.

Further, to evacuate the inside of an airtight container, after the airtight container has been assembled, an exhaust pipe and a vacuum pump which are not shown are connected and the inside of the airtight container is evacuated to the degree of vacuum of about $10^{-5}$ (Pa). Subsequently, the exhaust pipe is sealed. To maintain the degree of vacuum of the airtight container, a getter film (not shown) is formed at the predetermined position of the airtight container immediately before or after it has been sealed. The getter film is a film formed by heating and evaporating a getter material whose main component is Ba, for example, by a heater or high-frequency heating, and the inside of the airtight container is maintained in the degree of vacuum of $10^{-3}$ to $10^{-5}$ (Pa) by the adsorption operation of the getter film.

In the image-forming apparatus which uses a display panel described above, if a voltage is applied to each of the cold-cathode devices 1012 via the ex-container terminal Dx1, Dxm, Dy1 or Dyn, an electron is emitted from each of the cold-cathode devices 1012. Simultaneously, a high voltage of several hundreds of volts or several kilo volts is applied to the metal-backed phosphor screen 1019 and the emitted electron described above is accelerated and then is made to collide against the inside of the face plate 1017. Consequently, each of color phosphors which forms the phosphor screen 1018 is excited and emitted, thereby displaying an image.

Usually, the applied voltage of the cold-cathode device 1012 to the surface conduction electron-emitting device of the present invention is about 12 to 16 (V), the distance d between the metal-backed phosphor screen 1019 and the cold-cathode device 1012 is about 0.1 (mm) to 8 (mm) and the voltage between the metal-backed phosphor screen 1019 and the cold-cathode device 1012 is about 0.1 (kV) to 10 (kV).

The basic configuration and manufacturing method of a display panel and an outline of an image-forming apparatus are described above.

EXAMPLES

In each example described below, an electron beam source in which N×M pieces (N=3,072 and N=1,024) surface conduction electron-emitting devices of the type having the electron-emitting region in the conductive film between the electrodes described previously are wired in a matrix shape is used as a multiple electron beam source.

Example 1

In this example, a spacer is obtained as follows. The details will be described referring to FIG. 1. The glass basic material having S2=18 $mm^2$ (9 mm×2 mm) is fed at a speed of v2=1 mm/min using a roller 504 as a spacer base material 501 and is softened at about 700 degrees C. by a heater 502. The glass basic material is drawn by a drawing roller 503 arranged in the vicinity of the heater so as to obtain v1=50 mm/min and is cut by a blade 505 so that the length can be set to 40 mm. Thereupon, the rough surfaces are formed on the surface of the drawing roller 503 with a sand paper of #4000, and such a consistent process as forms the rough state on the surface of a glass base member and obtains a spacer base material at the same time when the glass base material is heated and drawn is used. Next, a Cr-Al alloy nitride film is formed in a coating thickness of 200 nm by simultaneously sputtering Cr and Al targets on the surface in which the rough state is formed on its surface as shown above by a high-frequency power supply as an antistatic, high-resistive film. Sputter gas is mixed gas whose Ar to N2 is 1 to 2, and the total pressure is 0.1 Pa. The sheet resistance of a film deposited simultaneously under the conditions described above is R/□=2×10$^{10}$ Ω/□. In addition to this, the present invention can use various antistatic films.

Further, a low-resistive film is formed in the area which becomes the junction of the upper and lower electrodes. Both a Ti film of 10 nm thick and a Pt film of 200 nm thick are vapor-phase-formed as a beltlike shape of 200 μm in the area which becomes the connecting portion by sputtering. At this time, the Ti film is required as a backing layer which reinforces the coating adhesion of the Pt film. Thus, a spacer with a low-resistive film is obtained. The coating thickness of the low-resistive film is 210 nm and the sheet resistance is 10 Ω/□.

The rough state is formed on the surface of the obtained spacer, and both the covering and continuity of the film in the rough state formation portion are good.

The display panel shown in FIG. 5 described previously is produced using the spacer obtained in this manner. The details will be described referring to FIG. 5 and FIG. 9. First, the substrate 1011 in which the row-directional wiring electrode 1013, the column-directional electrode 1014, an inter-electrode insulating layer 40 and the device electrode and conductive thin film of a surface conduction electron-emitting device are previously formed on a substrate is secured to the rear plate 1015. Then, the face plate 1017 in which the spacer is additionally provided 5 mm above the substrate 1011 as the space 1020 and the phosphor screen 1018 and the metal-backed phosphor screen 1019 is additionally provided inside is arranged via the side wall 1016 and each junction of the rear plate 1015, the face plate 1017, the side wall 1016 and the spacer 1020 is secured. The junction of the substrate 1011 and the rear plate 1015, the junction of the rear plate 1015 and the side wall 1016 and the junction of the face plate 1017 and the side wall 1016 are coated with frit glass (not shown) and sealed by baking them at 400 degrees C. or 500 degrees C. for ten minutes or more. Further, the spacer 1020 is arranged on the row-directional wiring 1013 on the side of the substrate 1011 and on the metal-backed phosphor screen 1019 on the side of the face plate 1017 via the conductive frit glass (not shown) in which a conductive filler or a conductive material such as a metal is mixed, and is bonded and electrically connected by baking it at 400 degrees C. or 500 degrees C. for ten minutes or more under an atmosphere simultaneously with the sealing of the aforementioned airtight container.

Figure 10:
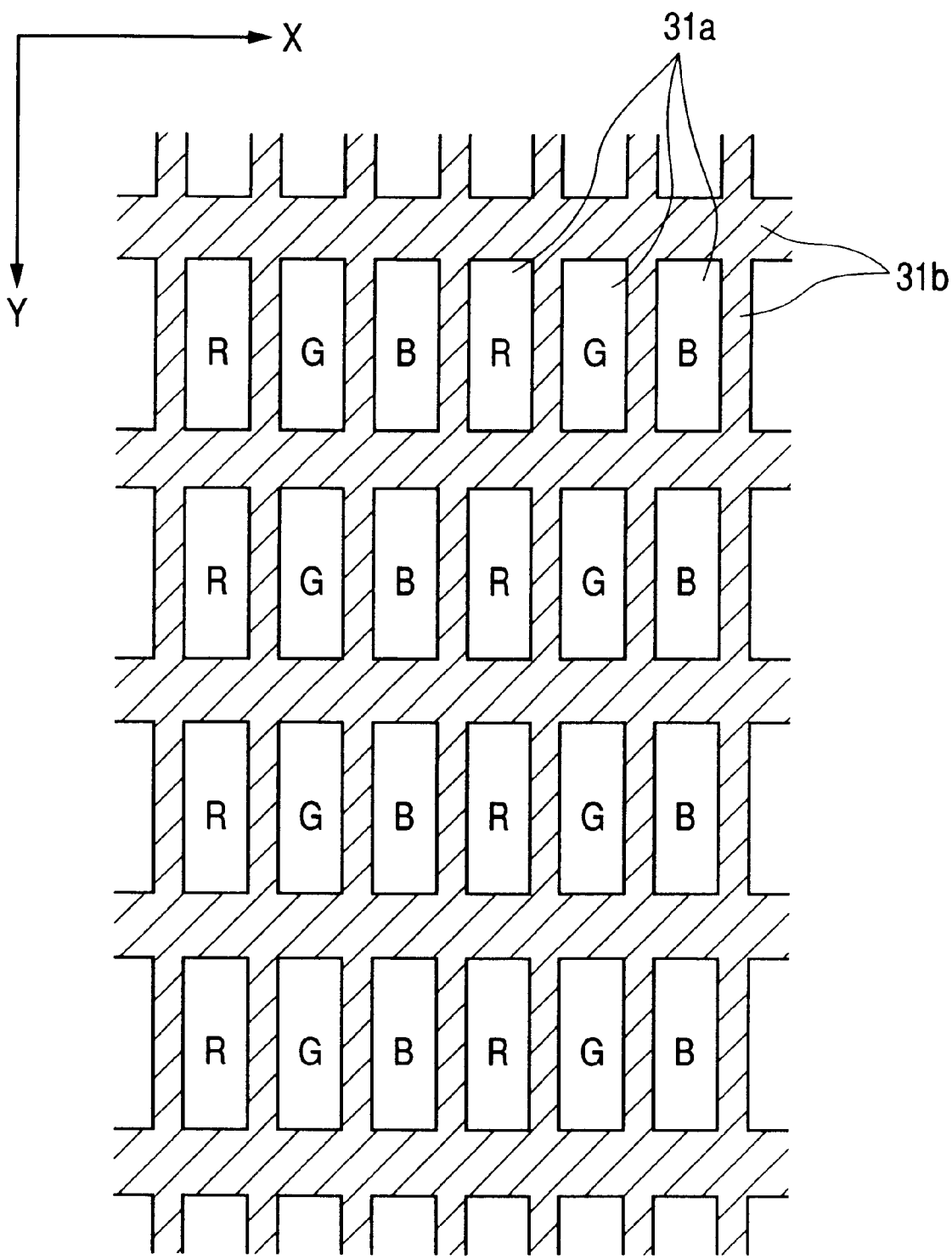
FIG. 10 is a view illustrating another configuration example of a phosphor.

Besides, in this example, as shown in FIG. 10, the phosphor screen 1018 uses a phosphor screen arranged so that each of color phosphors 31a adopts a stripe shape extending in the column direction (Y direction) and a black conductor 31b separates pixels in the Y direction as well as the phosphors (R, G, and B) 31a, and the spacer 1020 is arranged via the metal-backed phosphor screen 1019 inside the area of the black conductor 31b in parallel to the row direction (X direction). Besides, to perform the sealing described previously, because each color phosphor 31a and each device arranged on the substrate 1011 must be made to correspond to each other, the rear plate 1015, the face plate 1017 and the spacer 1020 are fully aligned.

After the inside of the airtight container completed in the manner described above has been evacuated by a vacuum pump via an exhaust pipe (not shown) and has arrived at a sufficient degree of vacuum, a multiple electron beam source is manufactured by feeding power to each device through the ex-container terminals Dx1 to Dxm and Dy1 to Dyn via the row-directional wiring 1013 and the column-directional wiring 1014 and performing energization forming operation and energization activation operation. Then, an exhaust pipe not shown is heated by a gas burner at the degree of vacuum of about 10$^{-4}$ Pa to melt it and perform the sealing of an envelope (airtight container). Finally, the getter operation is performed to maintain the degree of vacuum after sealing.

In the image-forming apparatus which uses such display panel as shown in FIG. 5 and FIG. 9, completed in this manner, an electron is emitted by applying a scan signal and a modulation signal to each cold-cathode device (surface conduction electron-emitting device) 1012 by a signal generating means not shown through the ex-container terminals Dx1 to Dxm and Dy1 to Dyn respectively, an emitted electron beam is accelerated by applying a high voltage to the metal-backed phosphor screen 1019 through the high-voltage terminal Hv and an image is displayed by making the electron collide with the phosphor screen 1018 and exciting and radiating each of the color phosphors 31a. Besides, the applied voltage Va to the high-voltage terminal Hv is applied to a limit voltage in which discharge slowly occurs within the range of 3 to 12 kV, and the applied voltage Vf between wiring 1013 and the wiring 1014 is 14 V. If continuous driving is enabled one hour or more by applying a voltage exceeding 8 kV to the high-voltage terminal Hv, withstand voltage is judged to be good.

For the image-forming apparatus produced in this example, the withstand voltage is judged to be good in the vicinity of a spacer. Further, including a luminescent spot caused by the emission electron from the cold-cathode device 1012 which is located near the spacer, luminescent spot columns are two-dimensionally formed at equal intervals and a clear color image can be displayed with good color reproduction. This indicates that such turbulence of an electric field as affects an electron trajectory is not generated if the spacer is installed.

Example 2

In this example, a spacer with a high-resistive film is manufactured in the same manner as Example 1 except that re-heating is applied after heating and drawing, as a method of obtaining the spacer base member.

Figure 11:
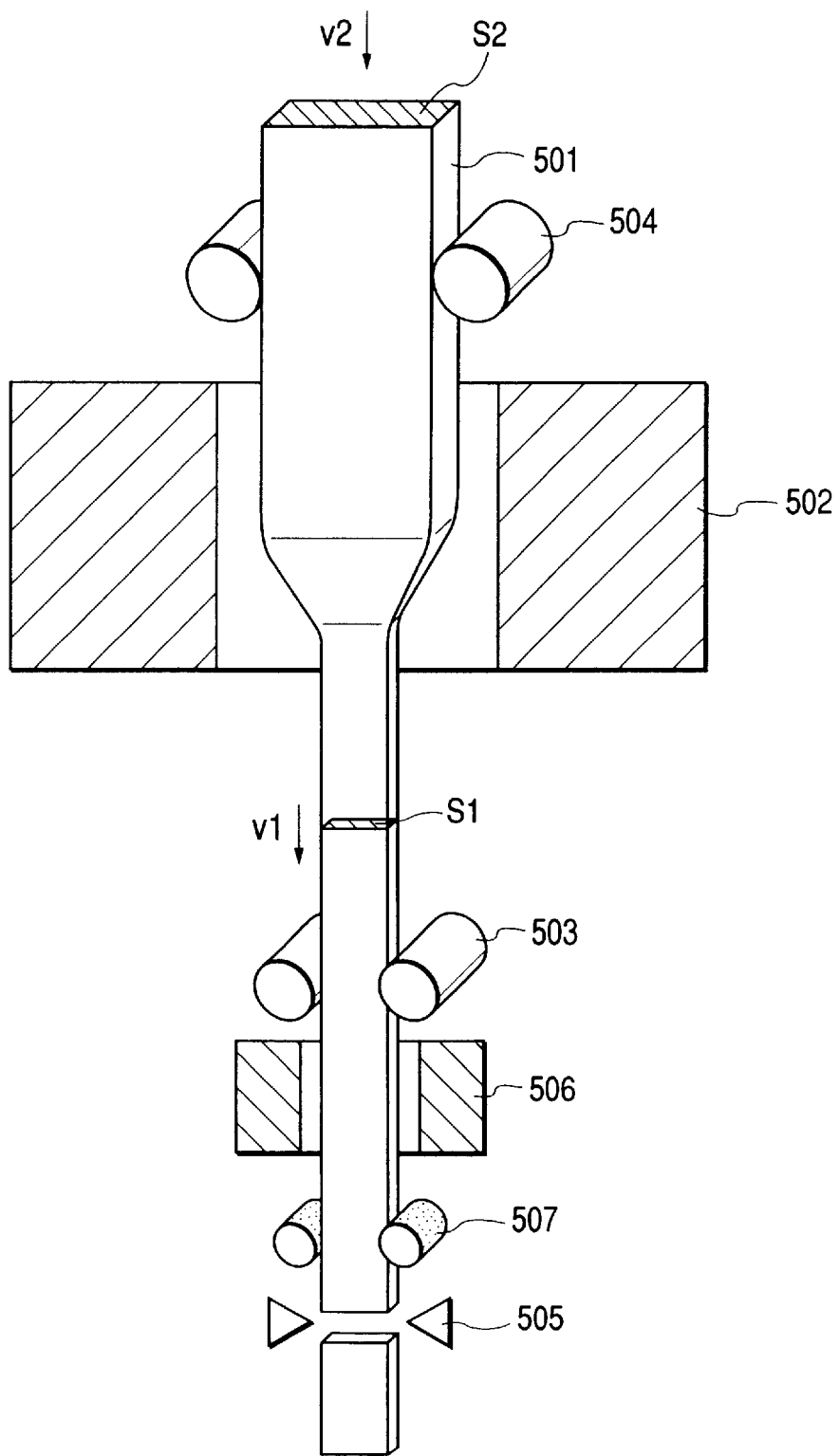
FIG. 11 is a view illustrating an example regarding the manufacturing method of the spacer of the present invention.

The spacer base member is obtained as follows. The details will be described referring to FIG. 11. The base material 501 of the spacer is the same as Example 1, and Example 2 differs from Example 1 in that the rough state as described in Example 1 is not formed on the surface of the roller 503 on the side of drawing and a heater 506 for auxiliary heating and a roller 507 for forming the rough state in which the rough state is formed on its surface are provided under this roller 503. This example also obtains the spacer base material through a consistent process.

The rough state is formed on the surface of a roller 507 with a sand paper of #4000 and the rollers 503 and 507 rotate at equal speeds. At this time, the glass plate drawn by the roller 503 according to the same processing as Example 1 is heated at about 600 degrees C. by the heater 506 for auxiliary heating before it has been cut and the rough state is transferred drawing the glass plate by the roller 507 for forming the rough state. Then, the spacer base member is obtained by cutting the glass plate to 40 mm by a blade 505.

Subsequently, a spacer is formed in the same succeeding process as Example 1.

The same result as Example 1 is obtained as performance, too, by incorporating such obtained spacer in an image display panel in the same manner as Example 1. In this case, as compared with the configuration in which only the remaining heat of the heating and drawing method is used like Example 1, the device design margin of a heating and drawing device and a rough state-forming apparatus is widened.

Example 3

In this example, a spacer base member is produced in the same manner as Example 1 except that the drawing roller 503 of Example 1 is heated. In this example, the roller 503 is additionally heated and a rough state is transferred.

A spacer is formed on this base member through the same succeeding process as Example 1.

The same result as Example 1 is obtained as performance, too, by incorporating such obtained spacer in an image display panel in the same manner as Example 1. In this case, as compared with the configuration in which only the remaining heat of heating and drawing is used, the design margin of a device is widened.

Example 4

Figure 12:
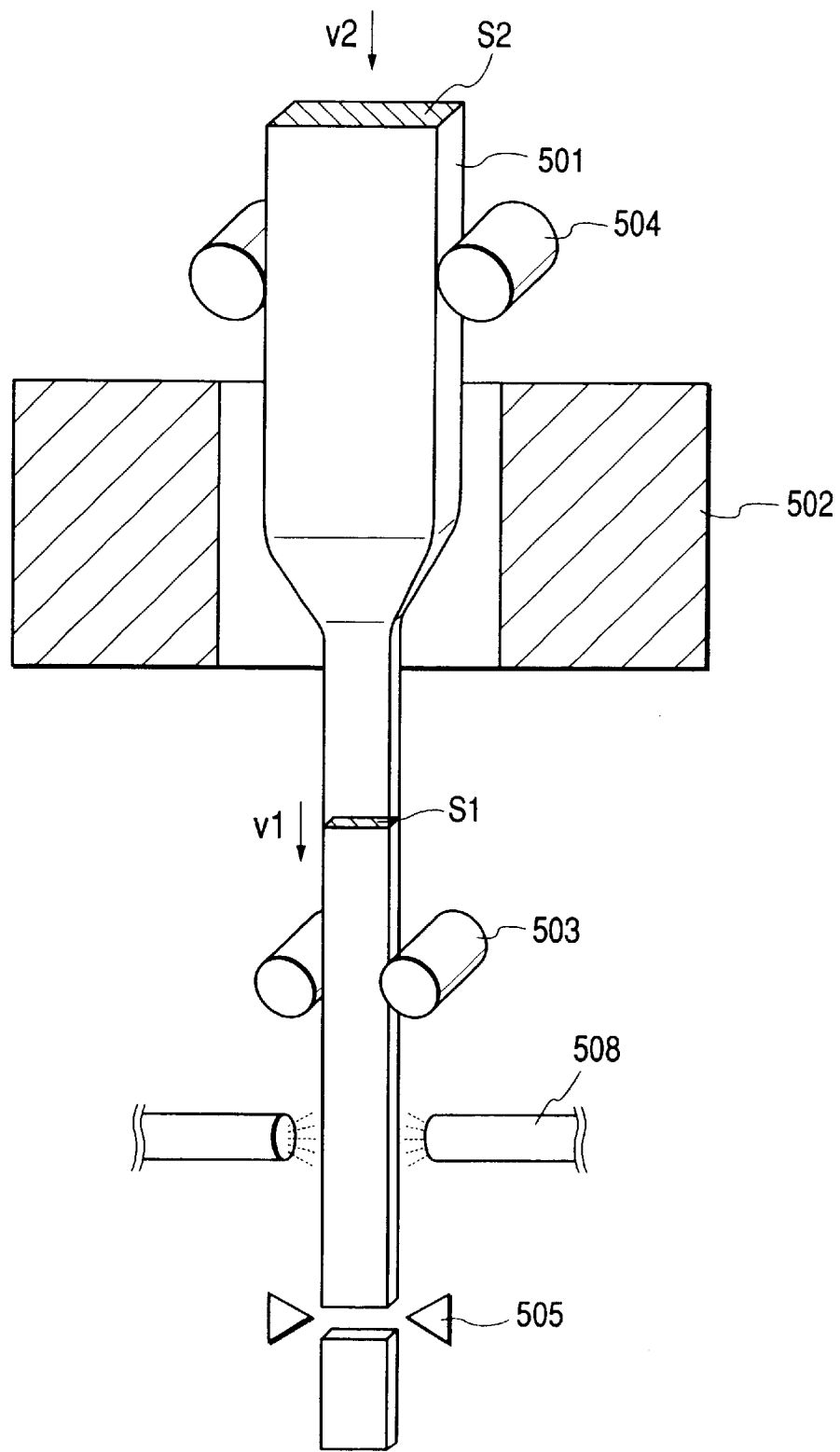
FIG. 12 is a view illustrating another example regarding the manufacturing method of the spacer of the present invention.

The spacer base member in this example is obtained as follows. The details will be described referring to FIG. 12. The base material is the same as Example 1, and Example 4 differs from Example 1 in that the rough state described in Example 1 is not formed on the surface of the roller 503 on the side of drawing and the rough state is formed behind (under) this roller 503 by a sand blast. In FIG. 12, 508 is a blast nozzle, and other materials are the same as FIG. 1. The blast grinding material is blasted from the position of 20 mm at the air pressure of 2.0 kgf/cm$^2$ with an alumina particle of #2000.

The spacer base member is obtained by feeding the base material to this system in the same manner as Example 1. The average roughness of the obtained substrate is 120 nm.

A spacer is formed on this substrate through the same succeeding process as Example 1.

The same result as Example 1 is obtained as performance, too, by incorporating such obtained spacer in an image display panel in the same manner as Example 1.

Example 5

Figure 2:
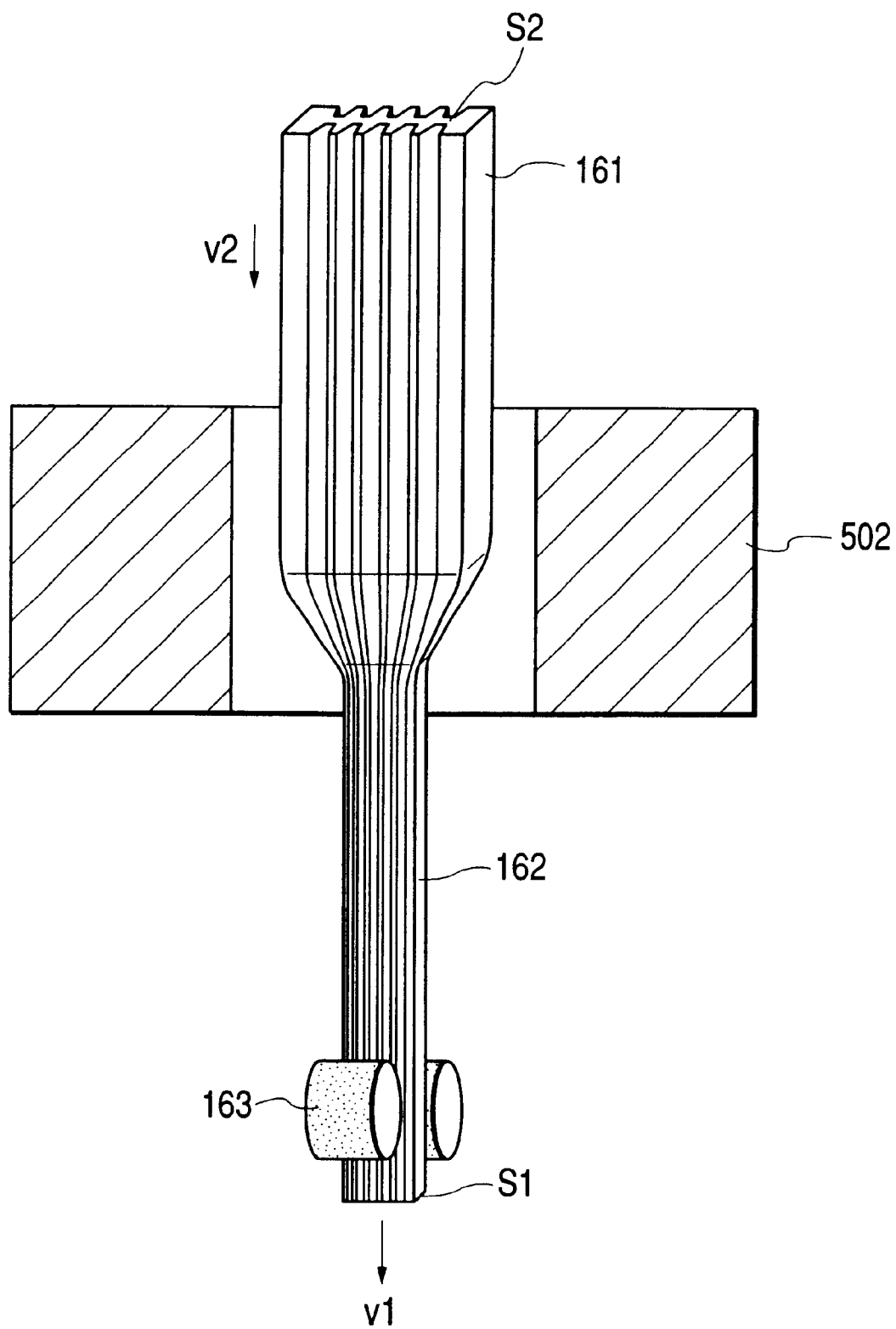
FIG. 2 is a view illustrating another example of the embodiments regarding the manufacturing method of the spacer of the present invention.

FIG. 2 is a diagram for describing this example, and FIG. 2 shows a schematic diagram of the formation method of a spacer base member.

In FIG. 2, 161 is a glass basic material which is the base material of a spacer and 162 is a heated, drawn and pulled base. 502 is a heating device and s2 is the cross section of the base material 161. Further, s1 is the cross section of the base material 162, V2 is the feed speed of a basic material and V1 is a spacer pulling speed.

The cross section S2 of the base material 161 is formed in the similar figure as the spacer cross section S1 to be formed. In this example, the spacer cross-sectional size to be formed shall be set to 1.8 mm×0.2 mm, and the 50-times size is set for the base.

Further, The base material glass uses PD200 (made by Asahi Glass) and the temperature of a furnace is about 760 degrees C.

The ratio of a similar figure, temperature, the base material feed speed V2 and the base material pulling speed V1 depend on the type and processing shape of a glass material, but they can be applied if the ratio of the similar shape is several times to several hundreds of times and the temperature is a temperature exceeding the softening point of the glass basic material. The temperature range used usually is 500 to 800 degrees C. Further, the feed speed of the base material needs to be at least lower than the pulling speed of the base, but the optimum conditions are decided arbitrarily. In this example, V2 is set to 1 m/min and V1 is set to 50 m/min.

Besides, in this example, the base material 161 uses a base material on which a groove is previously formed using a mold.

By this manufacturing method, a desired groove can also be formed on the surface of the spacer base member, too.

The same result as Example 1 is obtained as performance, too, by incorporating such obtained spacer in an image display panel in the same manner as Example 1.

Further, like this example, if a rough groove is formed on the spacer base material 161, this is desirable because a highly fine, the desired rough groove is formed on the base material portion 162 pulled by heating and drawing. Moreover, even if a slight error occurs in the rough groove of the base material 161, the error is canceled to a problem-free extent for the rough groove of the pulled base material portion 162. Therefore, the accuracy margin when the rough groove is formed on the base material 161 is obtained on a large scale and the effect of yield improvement is obtained.

Example 6

Figure 13:
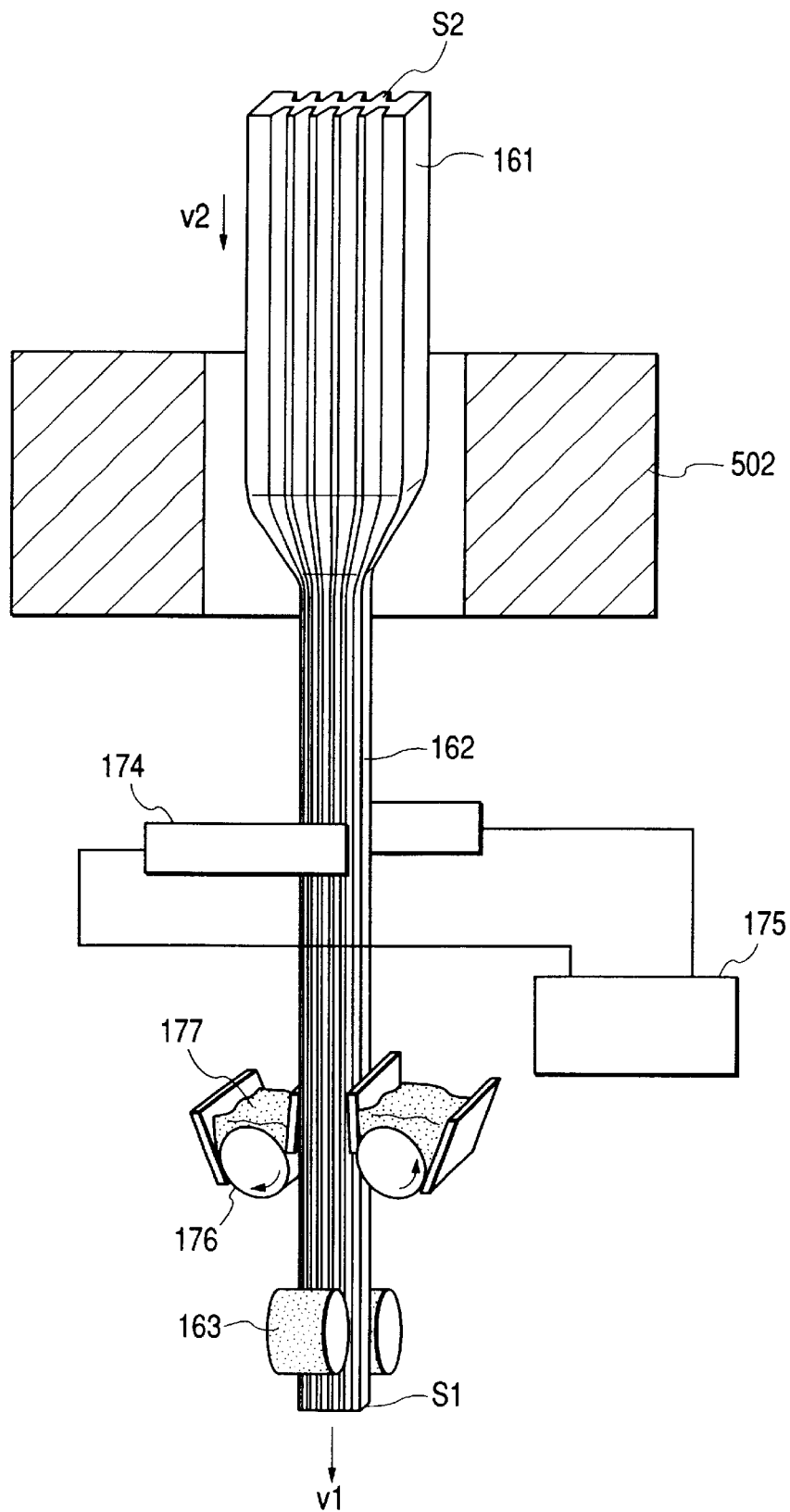
FIG. 13 is a view illustrating still another example regarding the manufacturing method of the spacer of the present invention.
Figure 14:
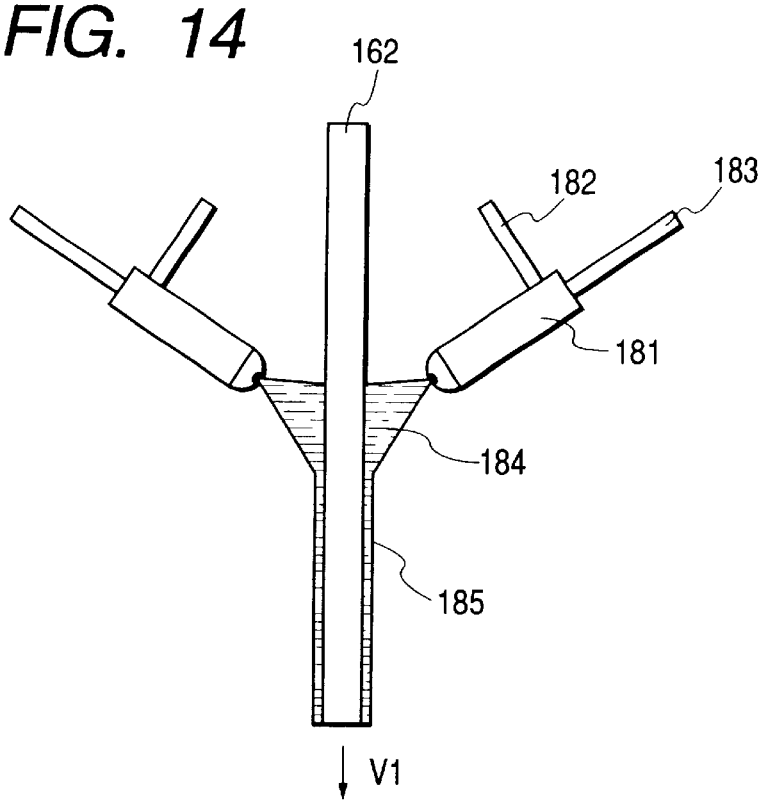
FIG. 14 is a view illustrating a formation method of a high-resistance film.
Figure 15:
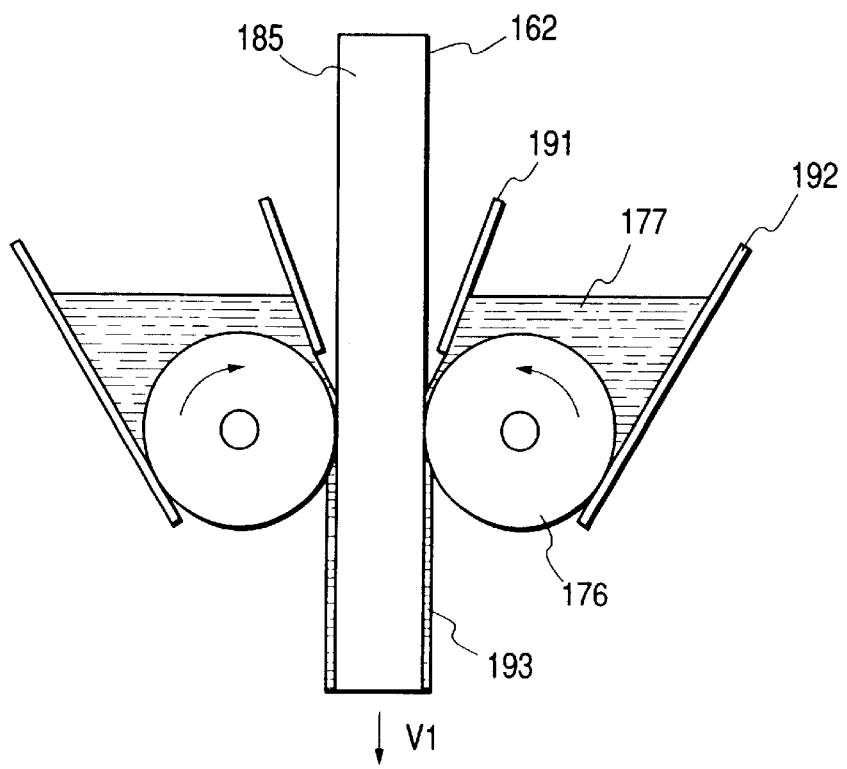
FIG. 15 is a view illustrating a formation method of a spacer electrode.

FIG. 13, FIG. 14 and FIG. 15 are diagrams for describing this example and FIG. 13 shows a schematic diagram of the formation method of a spacer base member. FIG. 14 is an illustration of the high-resistive film formation portion and FIG. 15 is an illustration of the electrode formation portion.

In FIG. 13, 161 is a glass base material and 162 is a glass material pulled out in a spacer shape. 502 is a heating device and 174 is a spray head portion. 175 is a spray controller and 176 is a transfer roller. 177 is a coating liquid for transfer and 163 is a pulling roller. Further, S2 is the cross section of the basic material 161 and S1 is the cross section of the spacer 162. V2 is the feed speed of a basic material and V1 is a spacer pulling speed.

The cross section S2 of the glass basic material and the spacer cross section S1 are formed in a similar figure. In this example, the cross-sectional size of a spacer to be formed is set to 1.6 mm×0.2 mm and the 12-times size is set to the basic material. Furthermore, the glass uses PD200 (made by Asahi Glass) and the temperature of a furnace is about 720 degrees C.

In this example, V2 is set to 0.5 m/min and V1 is set to 6 m/min.

Next, the formation method of a high-resistive film will be described referring to FIG. 14.

FIG. 14 is an illustration of a part of 174 of FIG. 13. In the diagram, 181 is a spray head and 182 is a coating solution supply line and 183 is a gas supply line. 184 is a coating solution fogged by a spray and 185 shows a formed high-resistive film.

In this example, a coating liquid is used in which carboxylic salt of silicon and stannous oxide is dissolved in an octane solvent at a mixed mole fraction of 2 to 1 of a metal in the carboxylic concentration of 10 mol/litter as the raw material of the high-resistive film. The coating liquid is applied to both surfaces of the spacer 162 using the nitrogen gas controlled by the spray controller 185, by the spray head 174. In this example, the direction of gravity almost matches the pulling direction and the spray head 181 performs spraying against the coating surface of the spacer 162 by being tilted to about 40 degrees. Besides, in this example, the surface temperature of the spacer of the high-resistive film formation portion is 400 degrees C. when it is measured.

Besides, if materials whose coating is enabled and which indicate values of resistivity of $10^5$ to $10^9$ Ωcm are used as the raw materials of a high-resisting film, various materials can be applied as single and composite materials.

Next, the formation method of a spacer electrode will be described referring to FIG. 15. In FIG. 15, 191 is a blade for coating the surface of a transfer roller 176 with a coating liquid for transfer 177. 192 is a part of the coating liquid for transfer 177 and 193 is a spacer electrode portion.

In this example, silver paste is used in the coating liquid 177. Further, the transfer roller uses a transfer roller in which a line-shaped groove at a pitch of 10 μm and a depth of 4 μm is formed in the perpendicular direction against space. Besides, the pitch of the groove and the size of the transfer roller and rotational speed can properly be selected for arbitrary values according to the viscosity of the transfer coating liquid, the characteristics of particles, coating thickness and the pulling speed V2 of a spacer substrate. Besides, in this example, the spacer surface temperature of the high-resistive film formation portion of the spacer electrode 193 is 360 degrees C. when it is measured.

Further, if materials whose coating is enabled and which indicate values of resistivity of less than $10^5$ Ωcm are used as spacer electrode materials, various materials can properly be selected and applied.

In this example, when the formed spacer is cut at a predetermined length and is applied to an image-forming apparatus in the same manner as Example 1, high-quality image formation with few color shifts is realized.

Like this example, the utilization efficiency of heat can be improved by using the heat when a substrate is formed for the formation of a high-resistive film and a spacer electrode. Further, the reduction of tact time is performed through a continuous process.

Further, in this example, the formation of the high-resistive film and the spacer electrode is performed using the heat when the substrate is formed, but heat can also be used for only drying. For example, in such case where the high-resistive film is formed by applying the liquid in which oxide particles are dispersed, the case frequently occurs where the crystal growth of oxide is required to obtain the function. In such case, after only drying has been performed through a continuous process, the high-resistive film can be formed by separately baking it. Also in this case, the drying process is continuously performed, the efficiency of quantity production can be increased.

Furthermore, in this example, a high-resistive film is formed in one layer. If it is formed in a multiple layer, spray coating can be performed matching the number of lamination layers.

Besides, in this example, the base material 161 uses a base material on which a groove is previously formed by cutting or machining. By this manufacturing method, a groove can also be formed on the surface of the spacer.

Further, the formation sequence of the high-resistive film and the spacer electrode can be reversed. Besides, the same result as Example 1 is obtained as performance, too, by incorporating such obtained spacer in an image display panel in the same manner as Example 1.

(Effects of the invention)

As described above, the present invention can provide a method of manufacturing a spacer having the surface structure which can suppress surface charging through a simple process and at a low price. Further, a spacer without product variations can be produced at low cost. Furthermore, the spacer whose charging is suppressed can be provided by depositing a proper high-resistive film.

Moreover, an electron-beam apparatus such as an excellent image-forming apparatus of excellent display quality whose displacement of a luminescent point and surface discharge caused by charging can be provided.

What is claimed is:

1. A manufacturing method of a spacer for an electron-beam apparatus which comprises an airtight container, and an electron source and the spacer arranged in the airtight container, said method comprising the step of heating and drawing a base material of the spacer to form a desired rough state on the surface of the base material.

2. The manufacturing method of the spacer for the electron-beam apparatus according to claim 1 which further has the step of forming an electroconductive film on the surface of the base member of the spacer formed by the heating and drawing step.

3. A manufacturing method of a spacer for an electron-beam apparatus which comprises an airtight container, and an electron source and the spacer arranged in the airtight container, said method comprising the step of heating and drawing a base material of the spacer to form a desired rough state and an electroconductive film on the surface of the base material.

4. A manufacturing method of a spacer for an electron-beam apparatus which comprises an airtight container, and an electron source and the spacer arranged in the airtight container, said method comprising the step of heating and drawing a base material of the spacer having a rough state on its surface.

5. The manufacturing method of the spacer for the electron-beam apparatus according to claim 4 which further has the step of forming an electroconductive film on the surface of a base member of the spacer formed by the heating and drawing step.

6. The manufacturing method of the spacer for the electron-beam apparatus according to claim 4, wherein an electroconductive film is formed on the surface of the base material in the heating and drawing step.

7. A manufacturing method of a spacer for an electron-beam apparatus which comprises an airtight container, and an electron source and the spacer arranged in the airtight container, said method comprising the steps of forming a rough state on the surface of a base material of the spacer, and then heating and drawing the base material on which the rough state is formed.

8. The manufacturing method of the spacer for the electron-beam apparatus according to claim 7 which further has the step of forming an electroconductive film on the surface of the base member of the spacer formed by the rough state formation step and the heating and drawing step.

9. The manufacturing method of the spacer of the electron-beam apparatus according to claim 7, wherein the electroconductive film is formed on the surface of the base material in the heating and drawing step.

10. The manufacturing method of the spacer for the electron-beam apparatus according to any one of claims 1 to 9, wherein the electron-beam apparatus is an image-forming apparatus comprising an airtight container, an electron source arranged in the airtight container, an image-forming member which forms an image by the irradiation of an electron from the electron source, and a spacer.

11. A manufacturing method of an electron-beam apparatus which comprises an airtight container, and an electron source and the space arranged in the airtight container, wherein the spacer is manufactured by the method described in any one of claims 1 to 9.

12. The manufacturing method of the electron-beam apparatus according to claim 11, wherein the electron-beam apparatus is an image-forming apparatus comprising an airtight container, an electron source arranged in the airtight container, an image-forming member which forms an image by the irradiation of an electron from the electron source, and a spacer.

* * * * *

UNITED STATES PATENT AND TRADEMARK OFFICE
CERTIFICATE OF CORRECTION

PATENT NO.     : 6,494,757 B2
DATED          : December 17, 2002
INVENTOR(S)    : Koji Yamazaki et al.

It is certified that error appears in the above-identified patent and that said Letters Patent is hereby corrected as shown below:

Column 7,
Line 66, "a." (first occurrence) should read -- a --.

Column 8,
Line 2, "and." should read -- and --.

Column 14,
Line 16, "loll" should read -- 1011 --.

Signed and Sealed this

Twenty-eighth Day of October, 2003

JAMES E. ROGAN
*Director of the United States Patent and Trademark Office*